United States Patent
Butt et al.

(10) Patent No.: US 7,200,832 B2
(45) Date of Patent: Apr. 3, 2007

(54) MACRO CELL FOR INTEGRATED CIRCUIT PHYSICAL LAYER INTERFACE

(75) Inventors: Derrick Sai Tang Butt, San Leandro, CA (US); Bruce C. Cochrane, San Jose, CA (US); Hui Yin Seto, San Jose, CA (US); William W. Lau, Foster City, CA (US); Thomas E. McCarthy, Cary, NC (US)

(73) Assignee: LSI Logic Corporation, Milpitas, CA (US)

( * ) Notice: Subject to any disclaimer, the term of this patent is extended or adjusted under 35 U.S.C. 154(b) by 308 days.

(21) Appl. No.: 10/810,294

(22) Filed: Mar. 26, 2004

(65) Prior Publication Data

US 2005/0229132 A1    Oct. 13, 2005

(51) Int. Cl.
   *G06F 17/50* (2006.01)
(52) U.S. Cl. .................... 716/17; 716/16; 716/15; 716/14
(58) Field of Classification Search .......... 716/14–17
   See application file for complete search history.

(56) References Cited

U.S. PATENT DOCUMENTS

| | | | | |
|---|---|---|---|---|
| 5,036,473 A * | 7/1991 | Butts et al. | .................... | 703/23 |
| 6,449,760 B1 * | 9/2002 | Tetelbaum et al. | ............ | 716/10 |
| 6,734,046 B1 * | 5/2004 | Dahl | ........................ | 438/129 |
| 6,763,028 B2 * | 7/2004 | Fujii | ........................ | 370/412 |
| 6,823,501 B1 * | 11/2004 | Dahl | ............................ | 716/9 |
| 6,894,530 B1 * | 5/2005 | Davidson et al. | ............. | 326/38 |
| 6,903,575 B1 * | 6/2005 | Davidson et al. | ............. | 326/47 |
| 6,941,536 B2 * | 9/2005 | Muranaka | ..................... | 716/14 |
| 6,970,966 B2 * | 11/2005 | Gemelli et al. | ............. | 710/305 |
| 2003/0236939 A1 * | 12/2003 | Kleveland et al. | .......... | 710/305 |
| 2005/0097493 A1 * | 5/2005 | Monthie et al. | ............. | 716/11 |

* cited by examiner

*Primary Examiner*—Thuan Do
*Assistant Examiner*—Naum Levin
(74) *Attorney, Agent, or Firm*—Westman, Champlin & Kelly, P.A.

(57) ABSTRACT

A macro cell is provided for an integrated circuit design having an input-output (IO) region with a plurality of IO buffer cells physically dispersed with other cells in IO slots along an interface portion of the IO region. The macro cell includes a plurality of macro cell IO signal slots that are physically dispersed so as to substantially align with the IO buffer cells in the interface portion. The macro cell also includes an interface definition having a plurality of interface IO signal nets, which are routed to corresponding ones of the plurality of macro cell signal slots. The macro cell is adapted to be instantiated as a unit in the integrated circuit design.

15 Claims, 21 Drawing Sheets

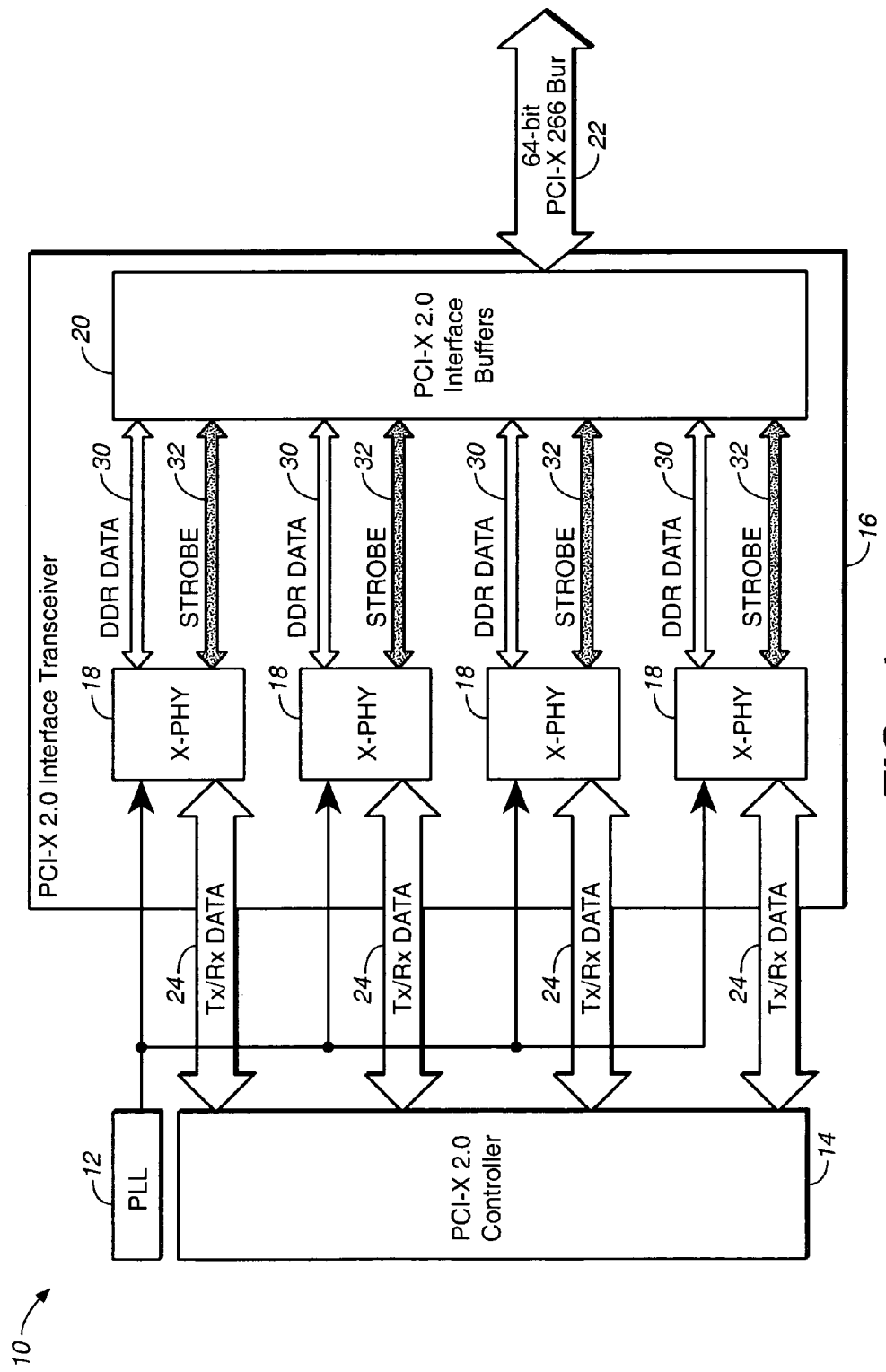
FIG._1

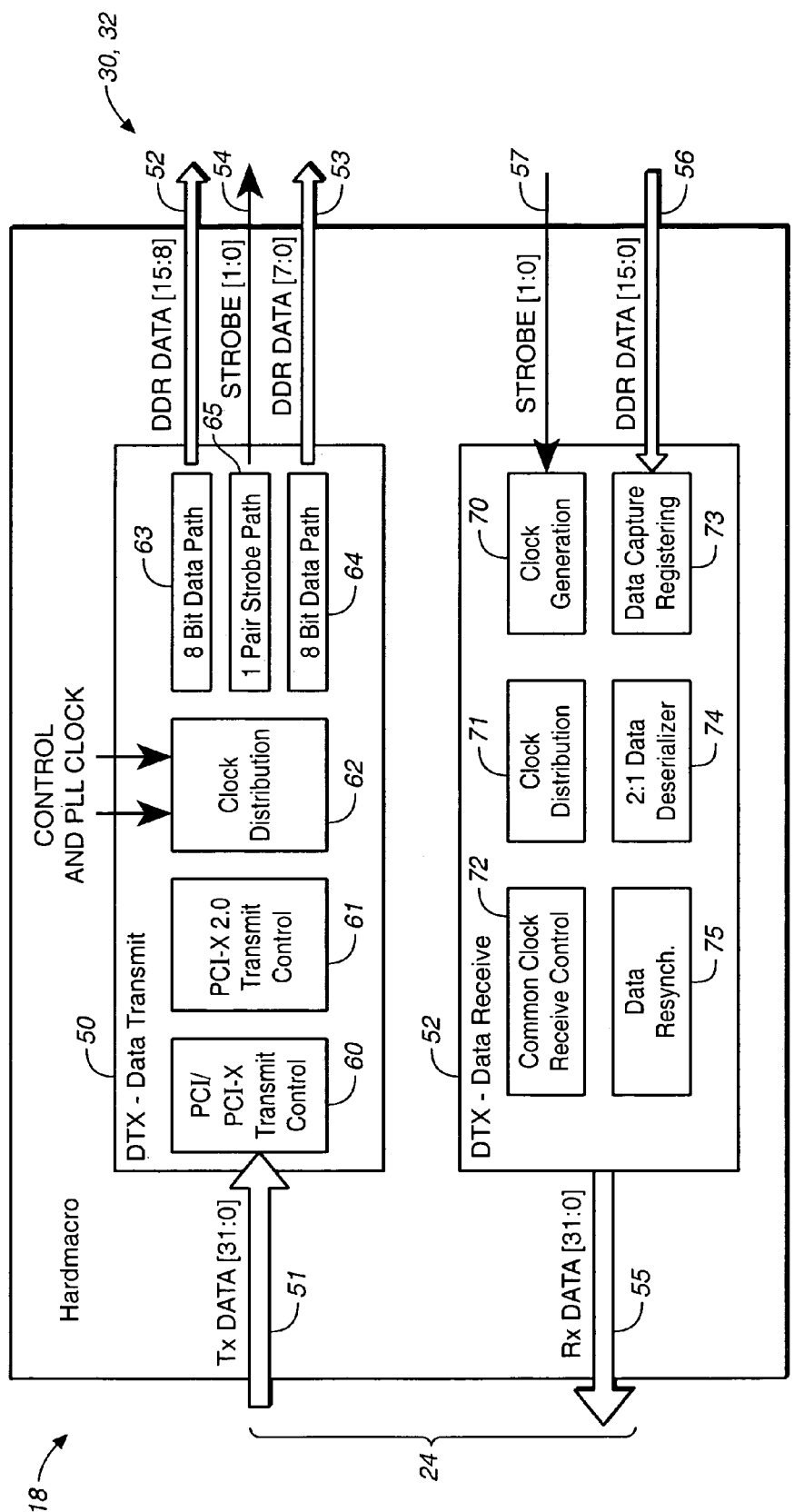
FIG._2

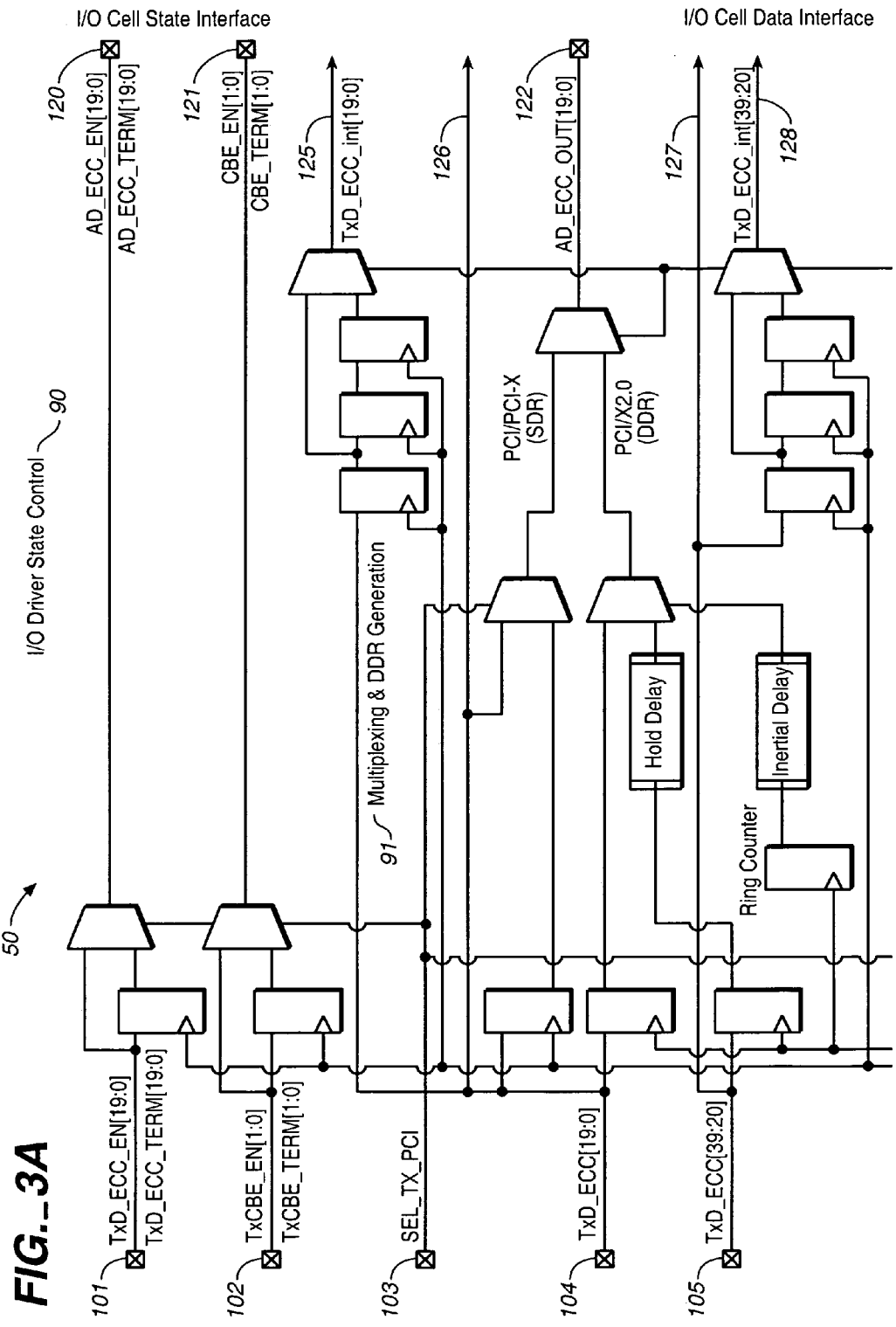
FIG._3A

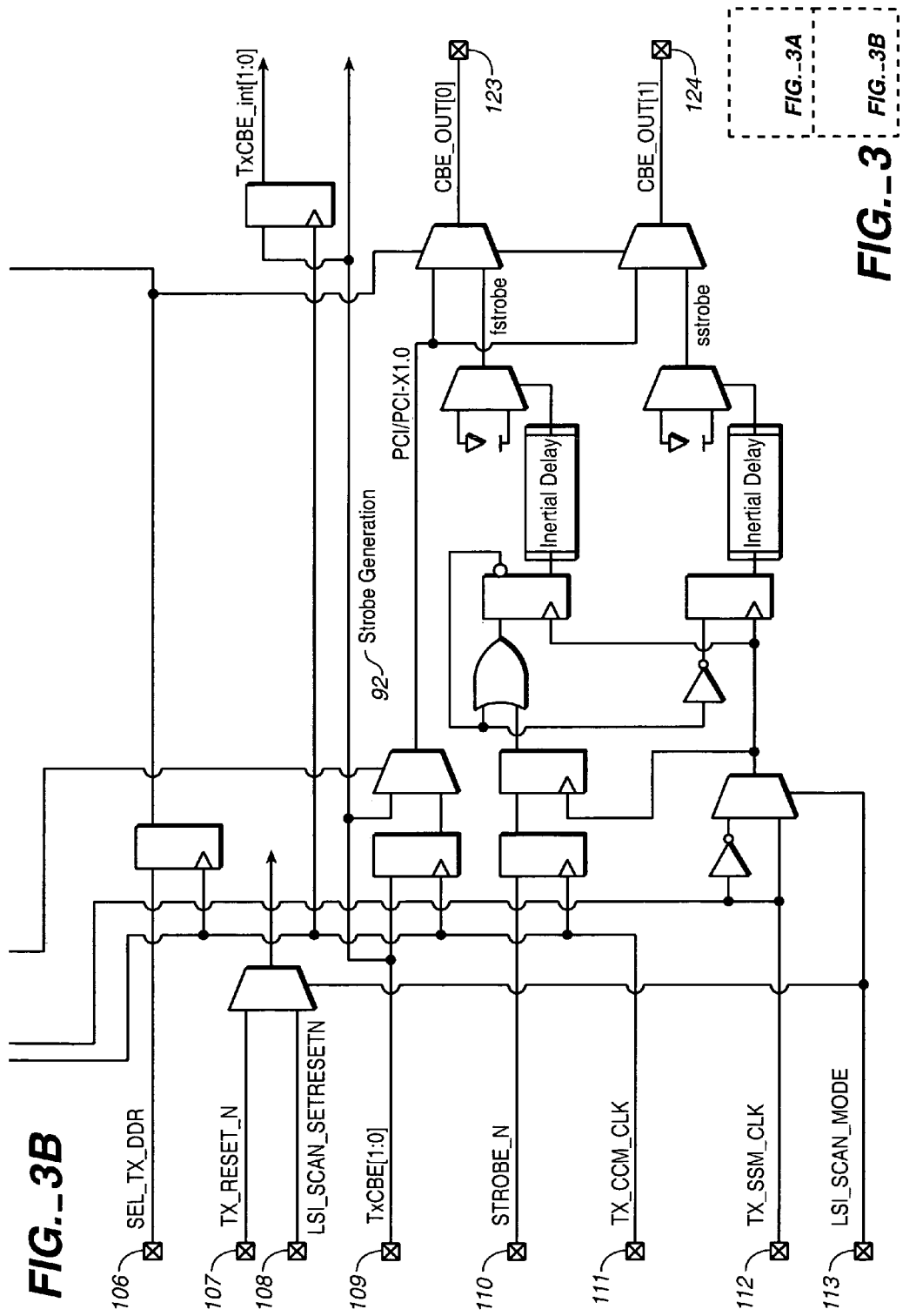

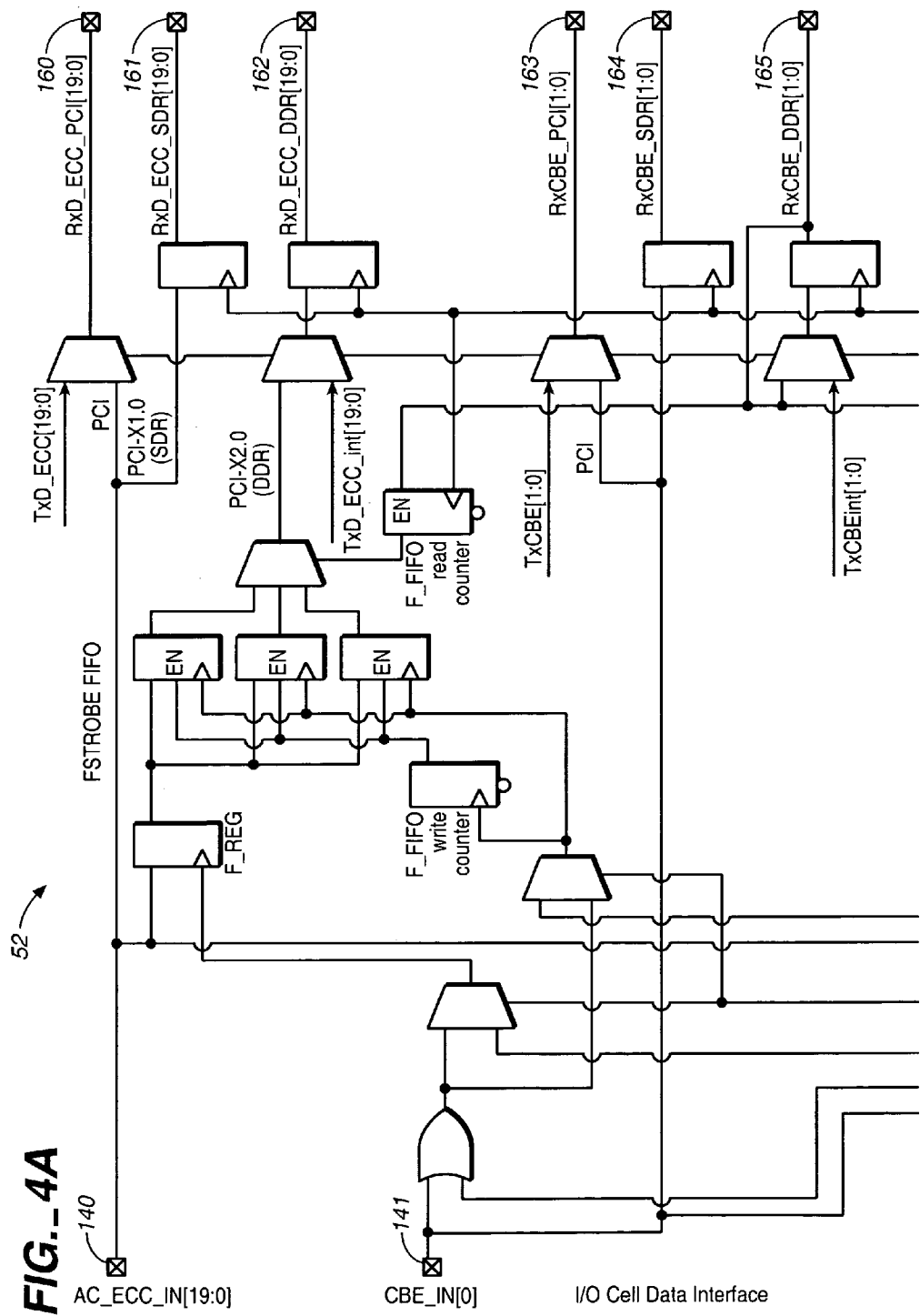
FIG._4A

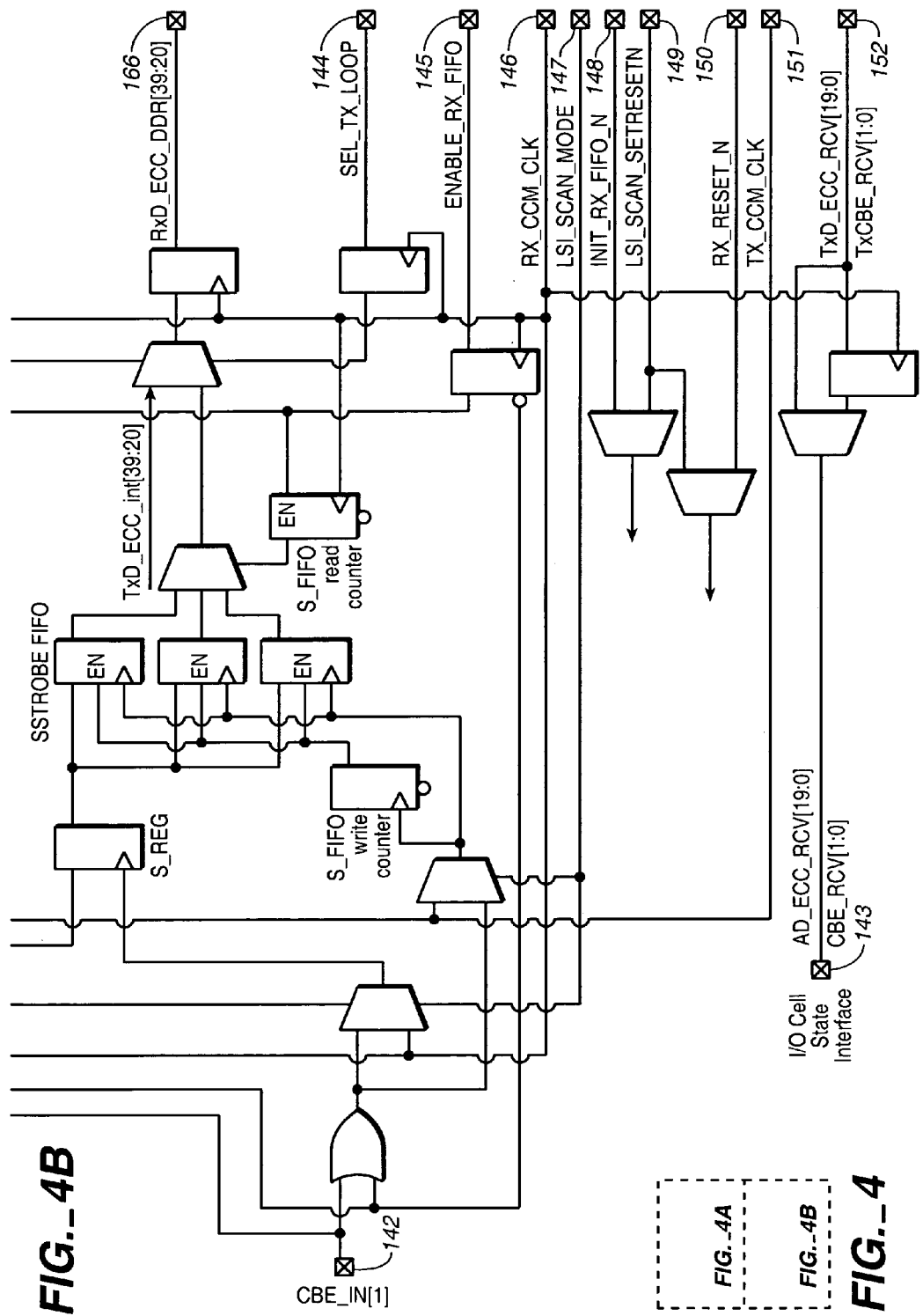

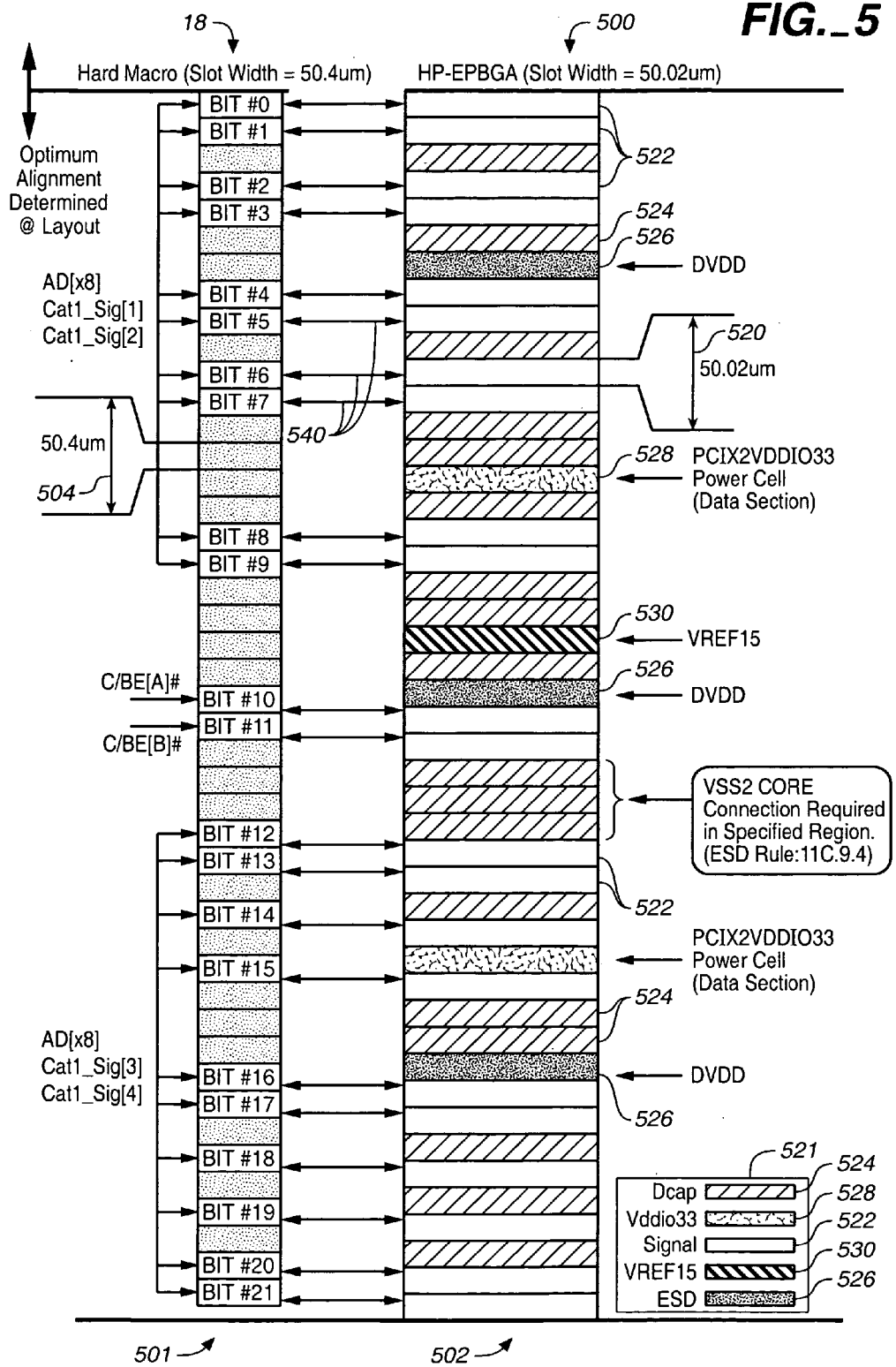
FIG._5

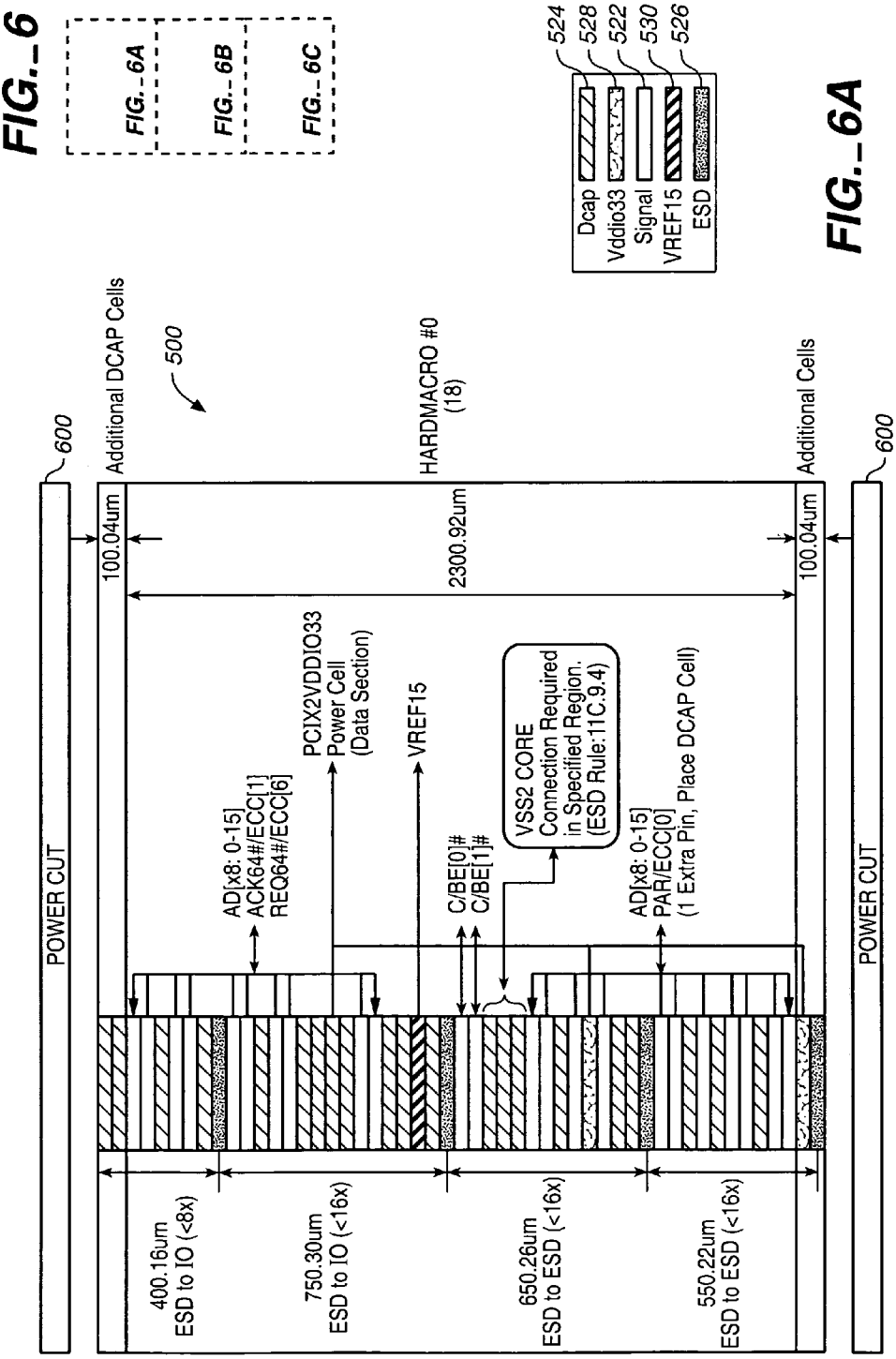

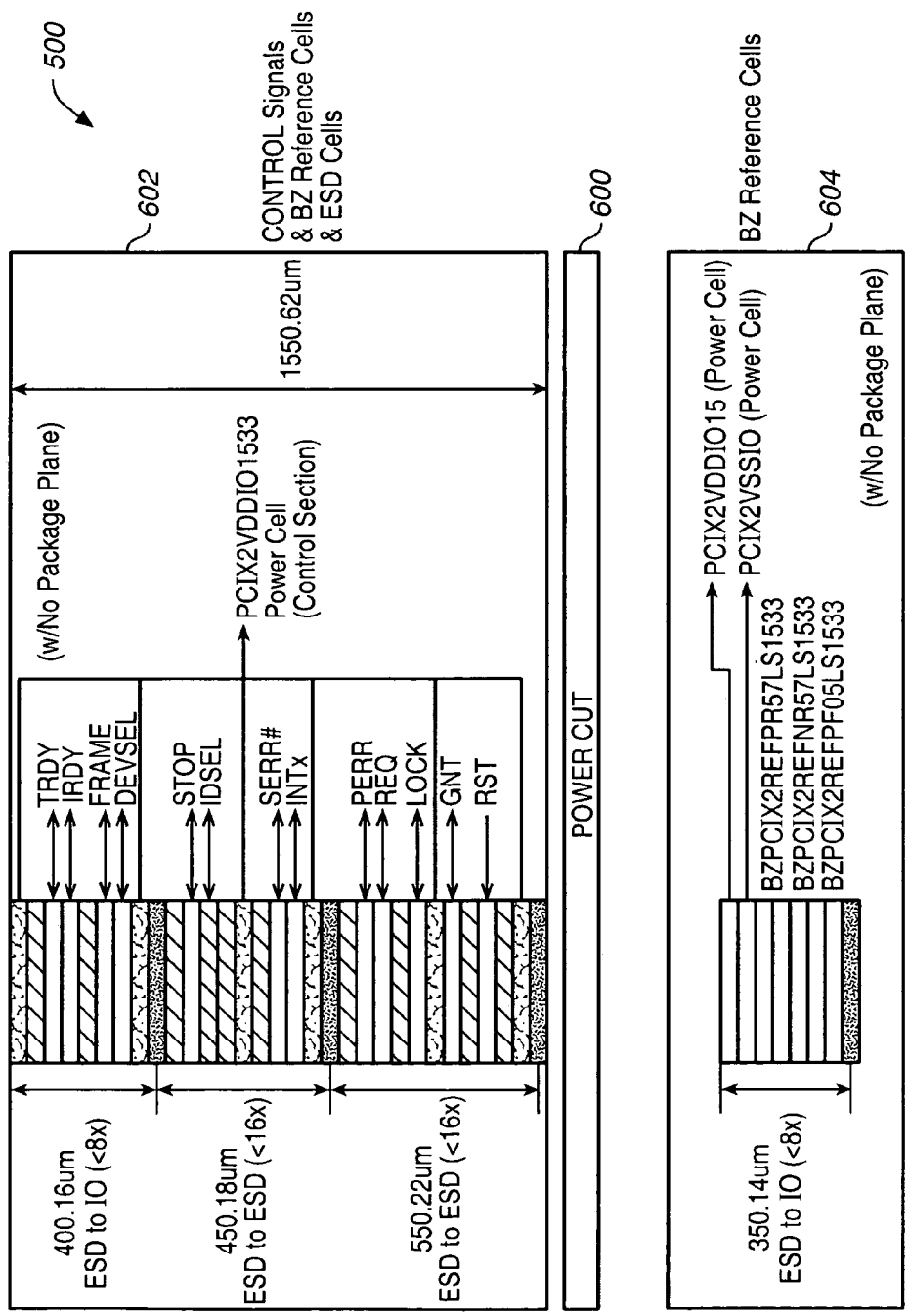
FIG._6B

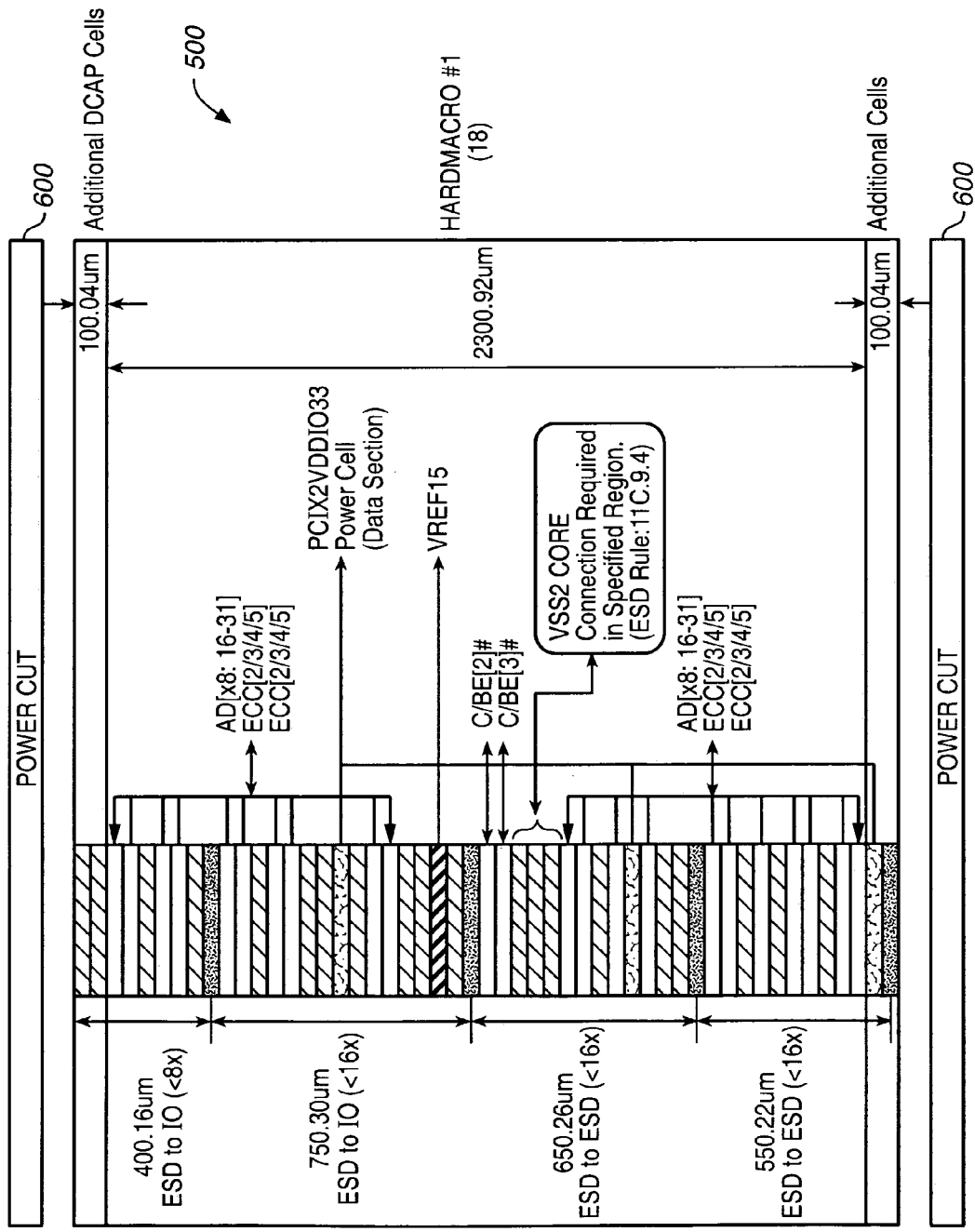
FIG._6C

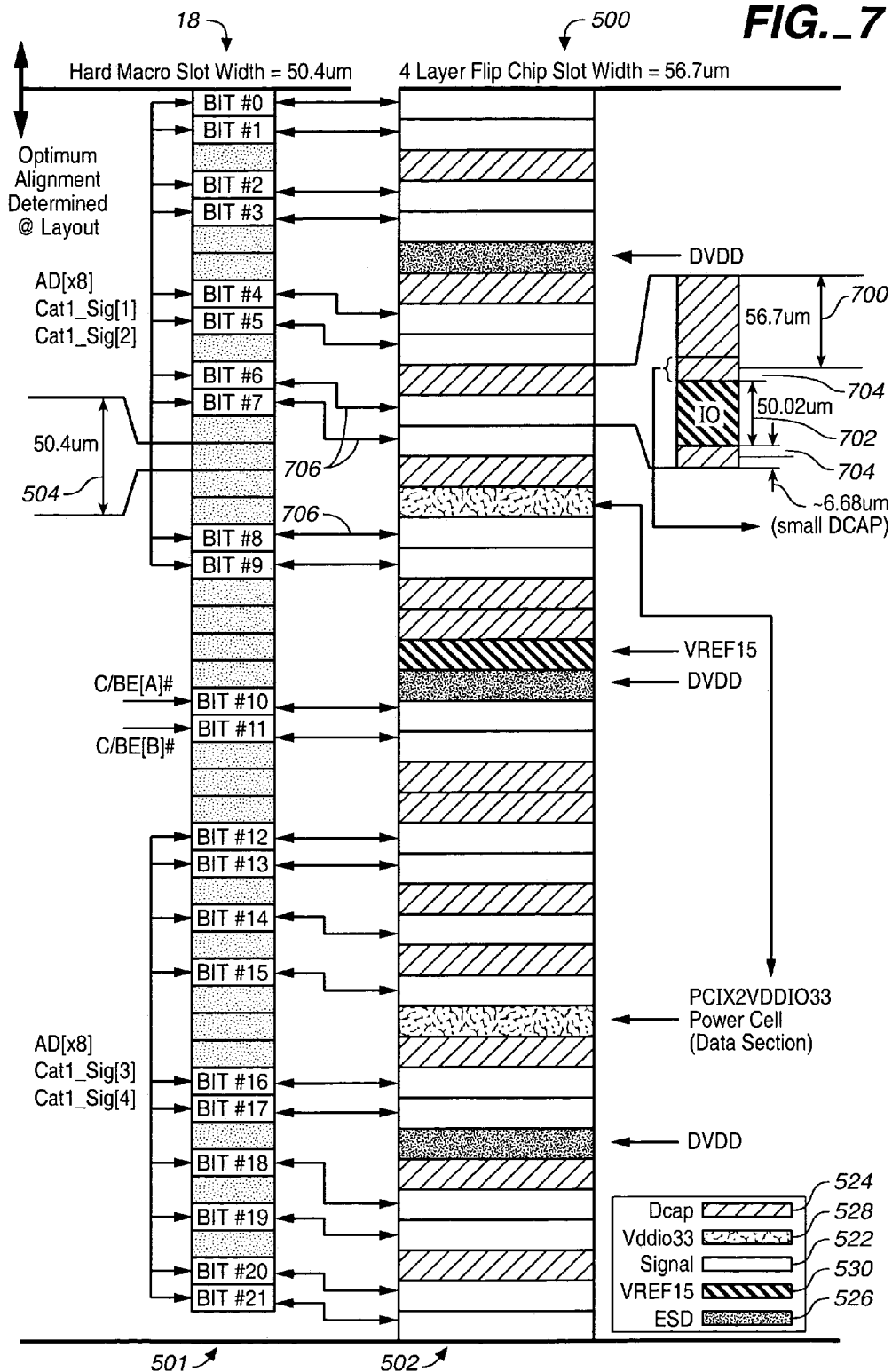
FIG._7

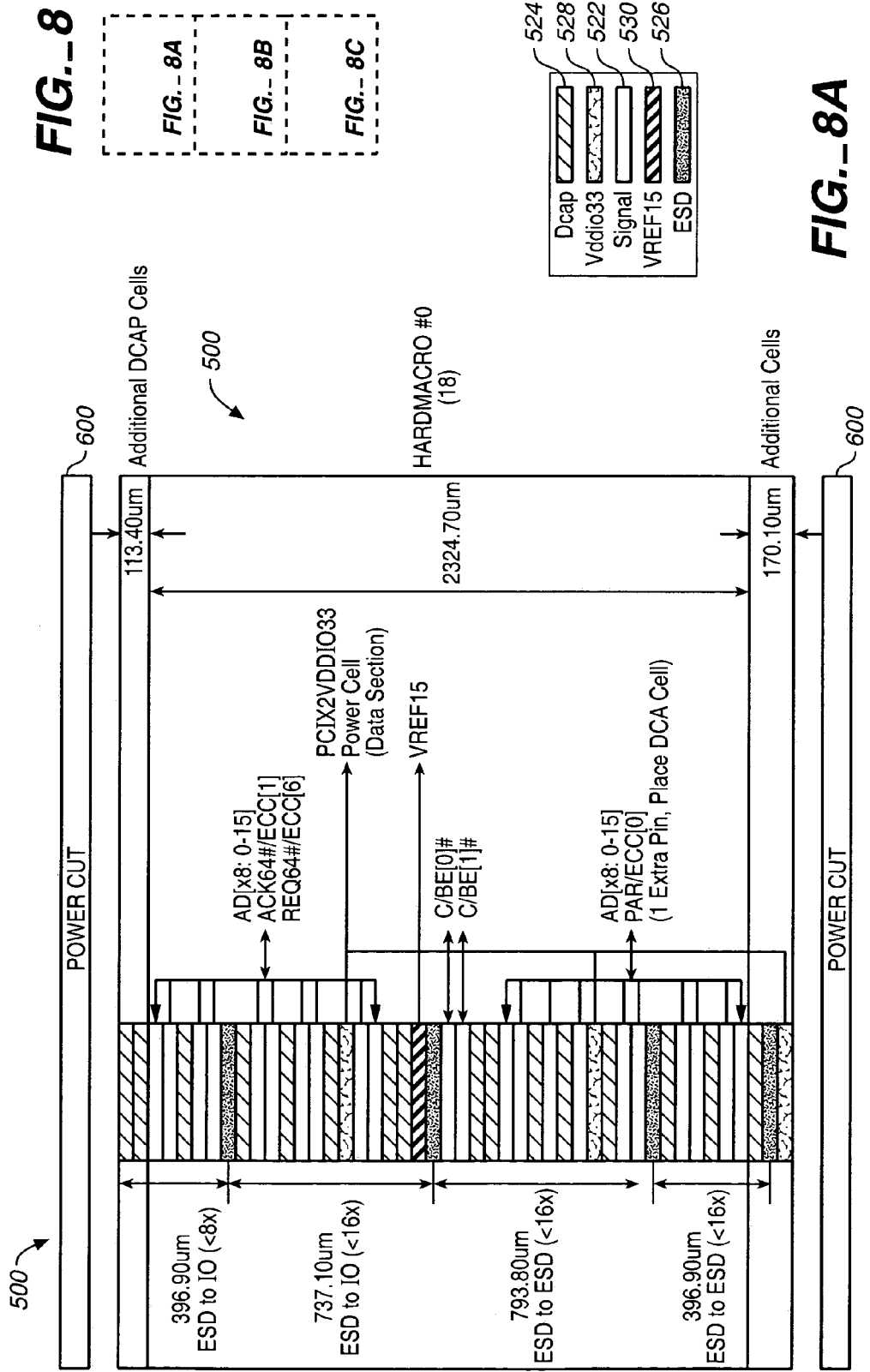

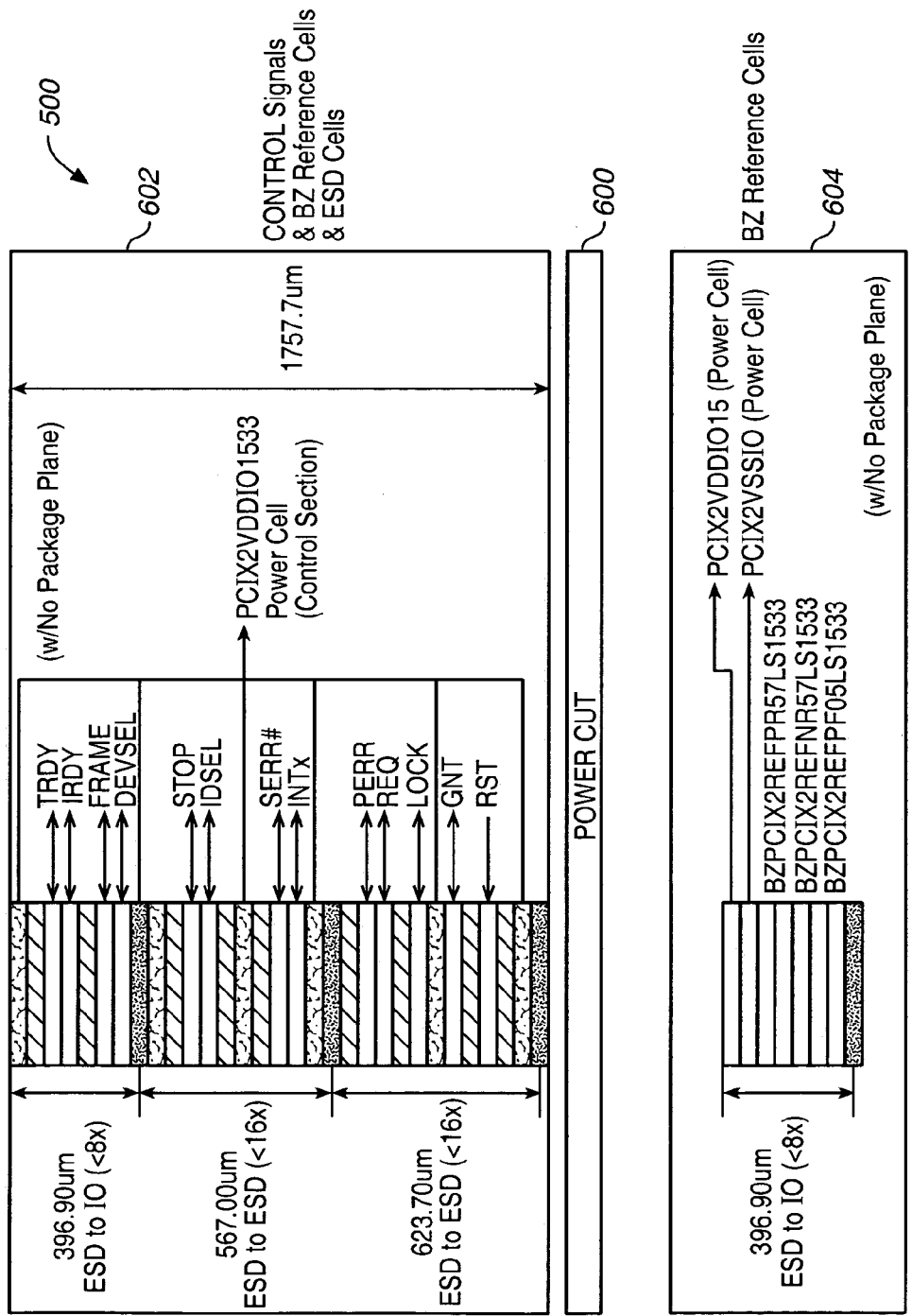
FIG._8B

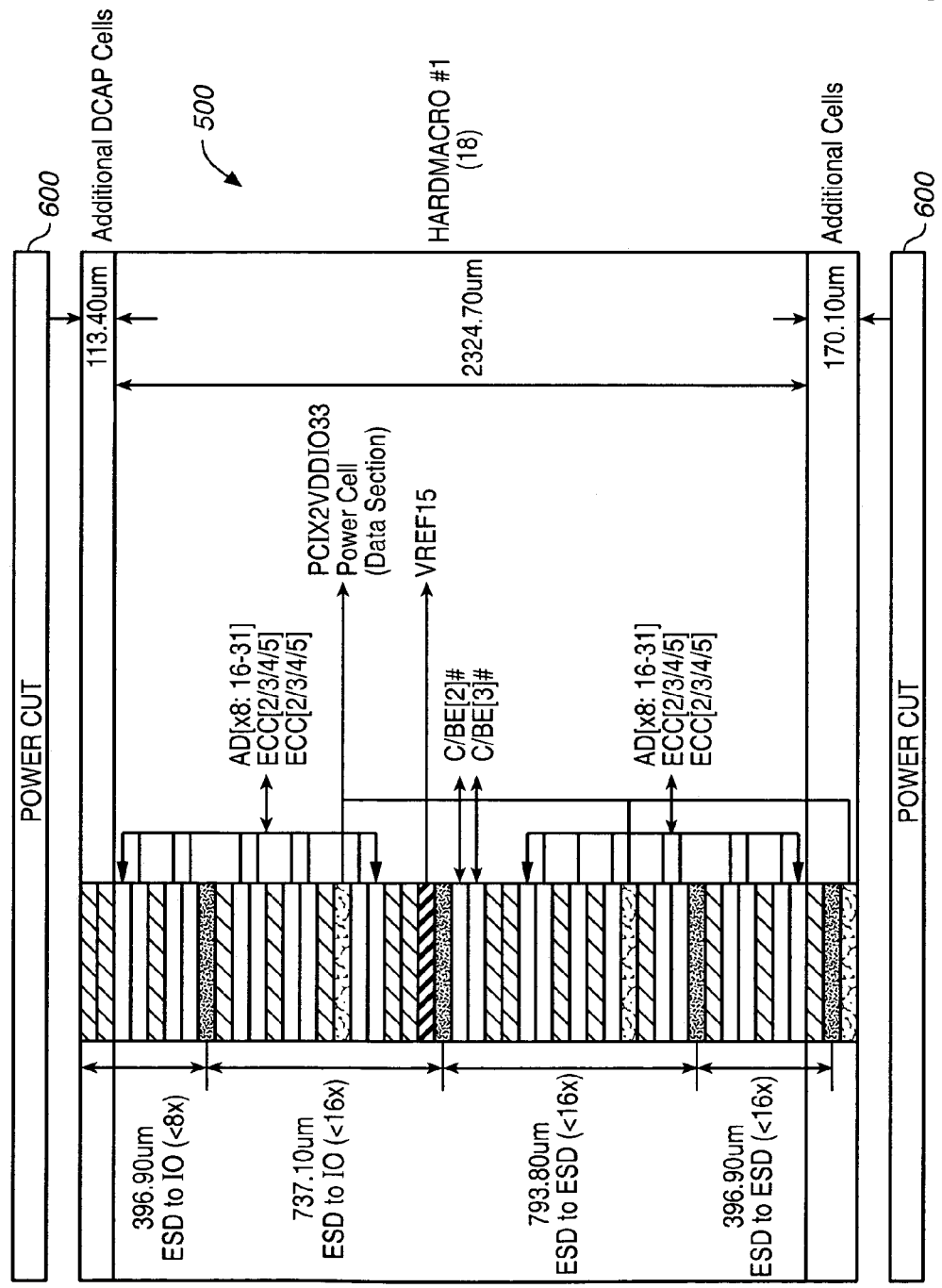
FIG._8C

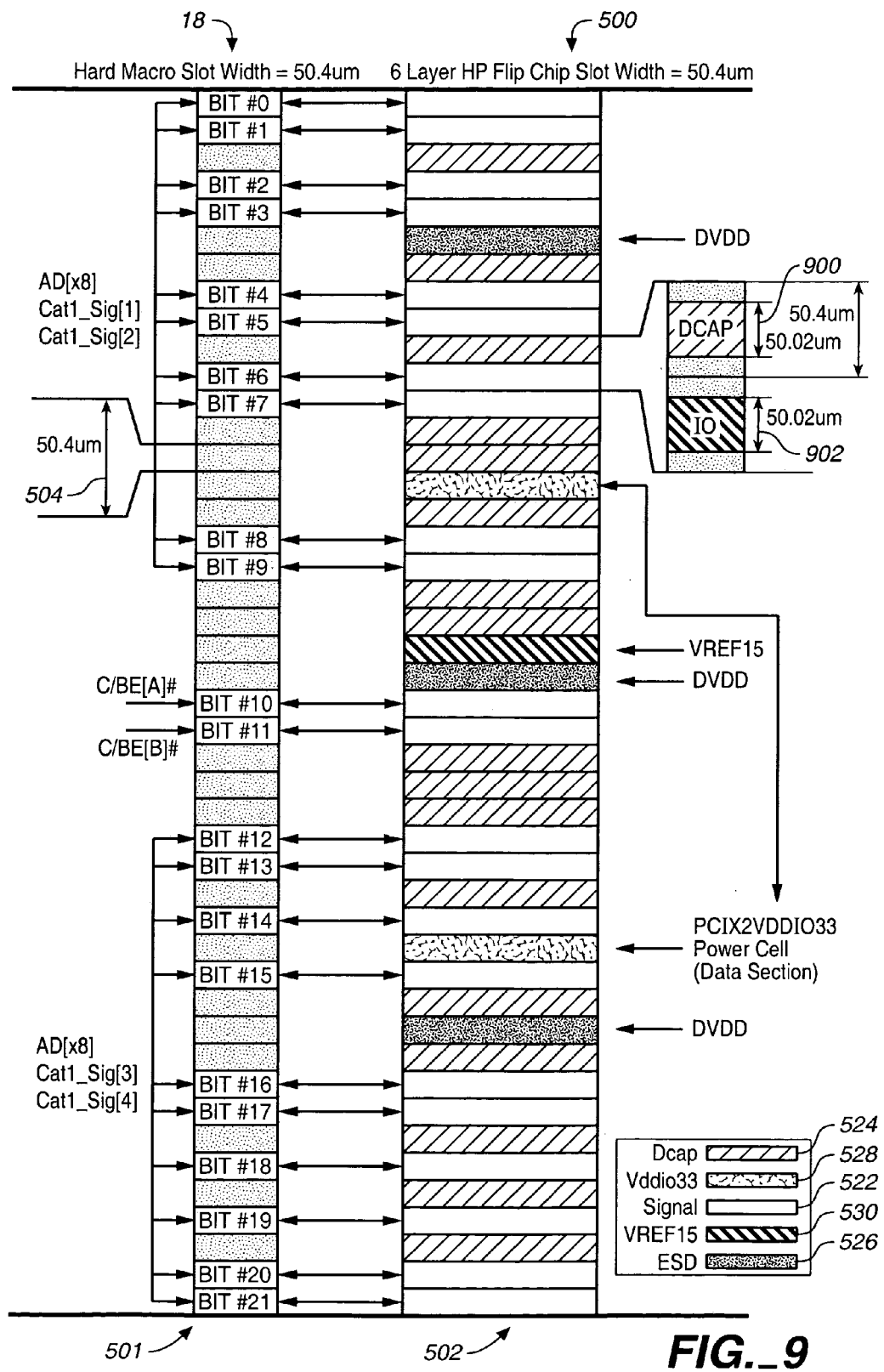
FIG._9

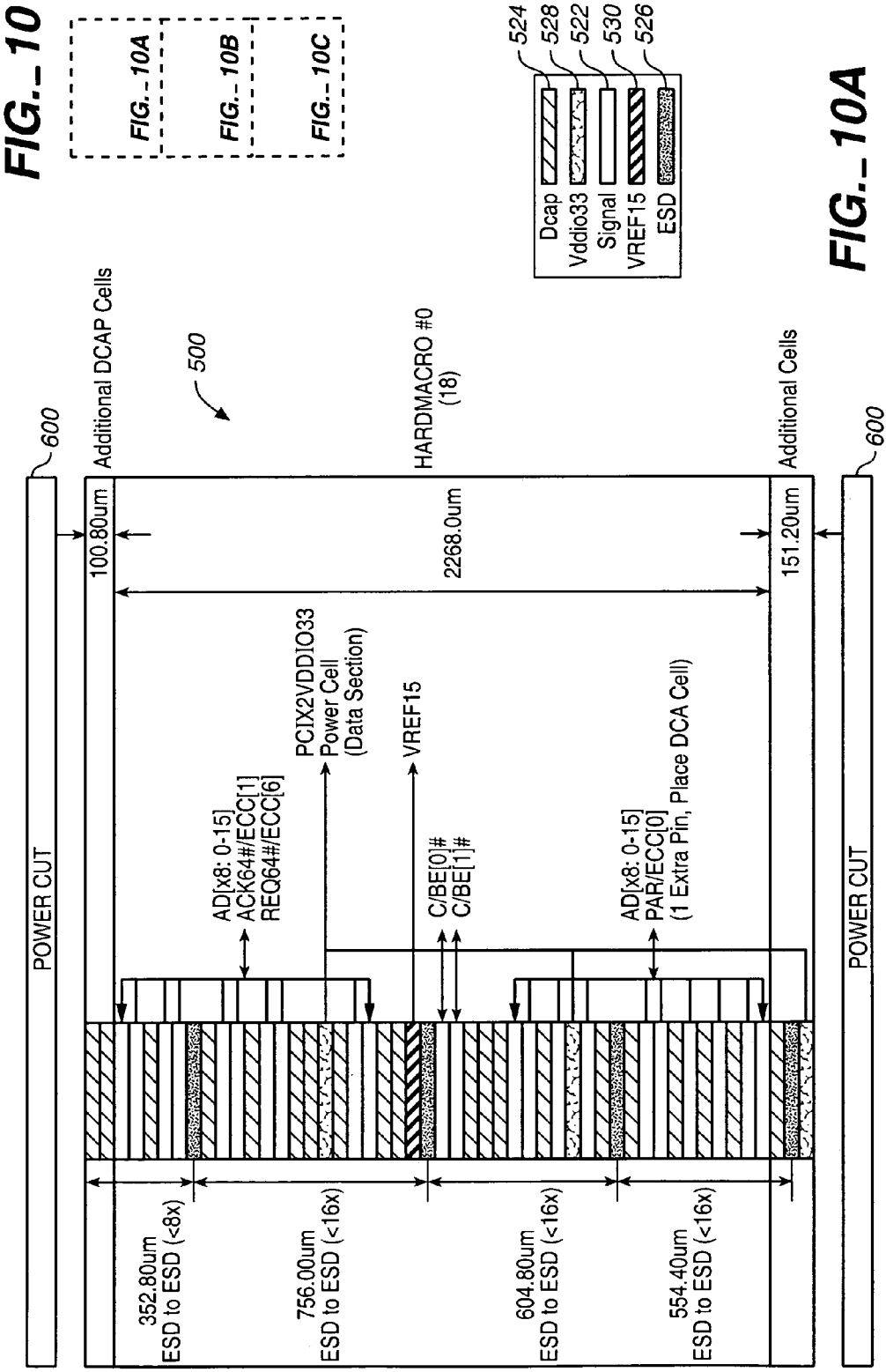

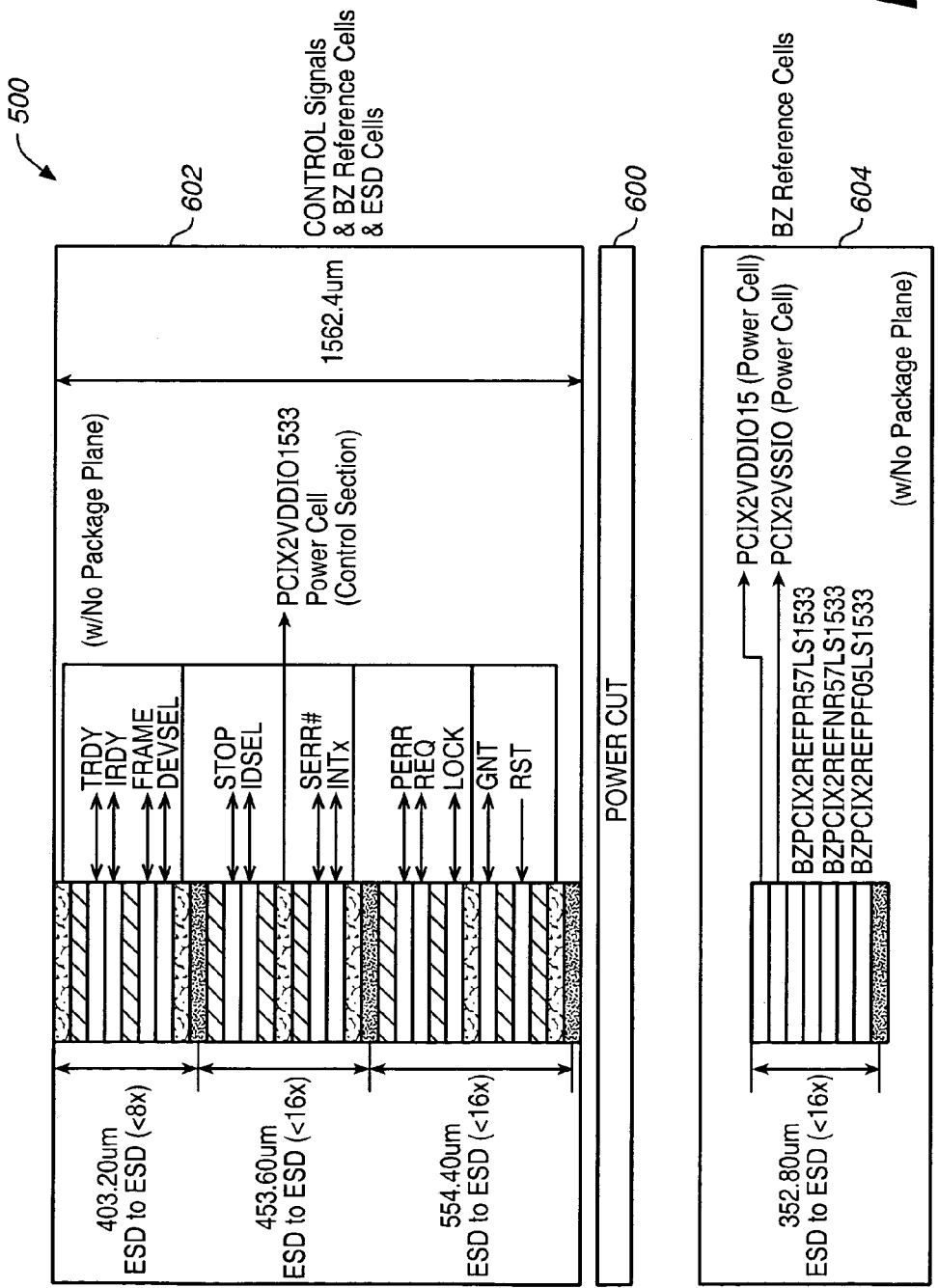
FIG._10B

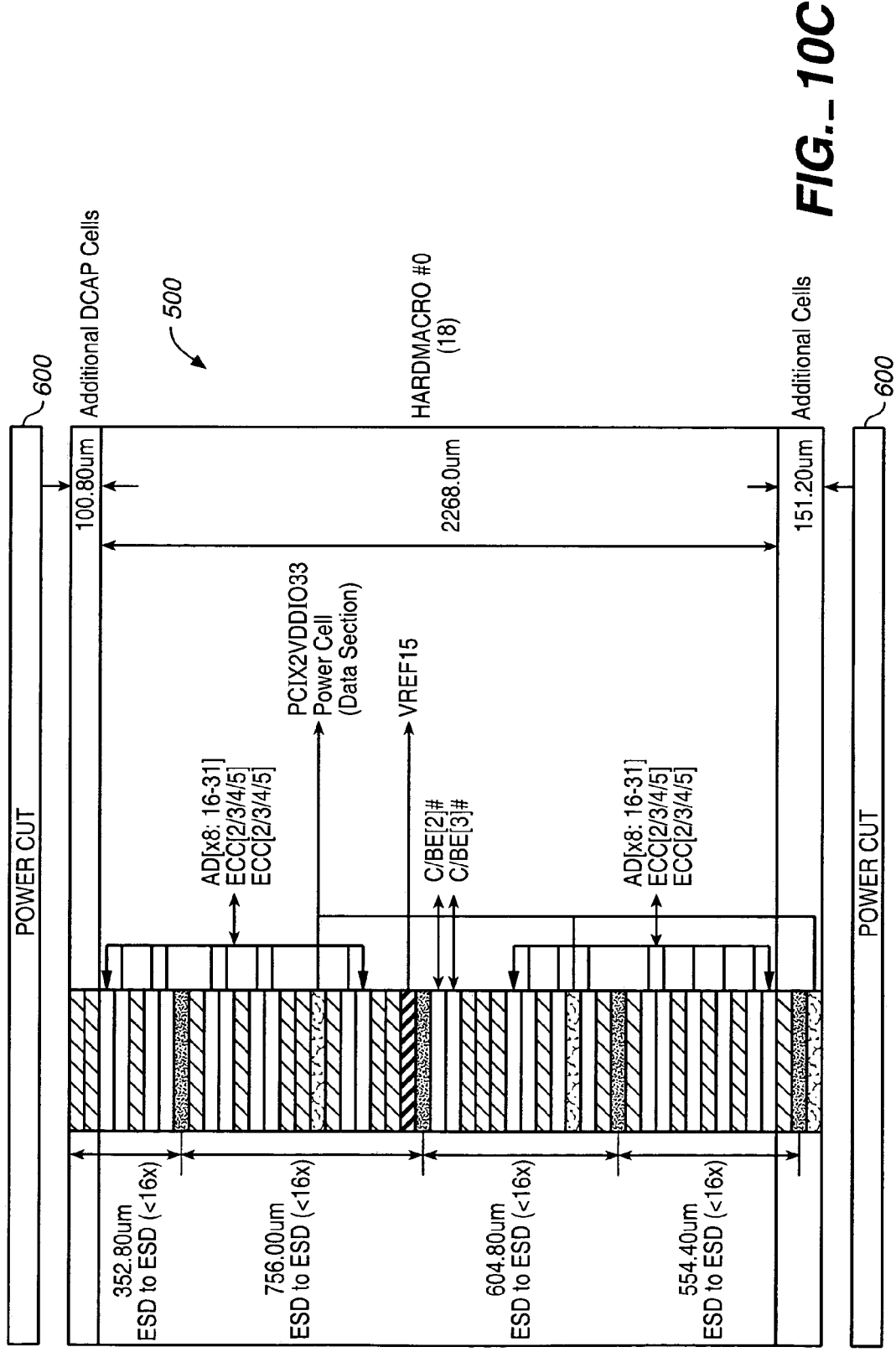
FIG._10C

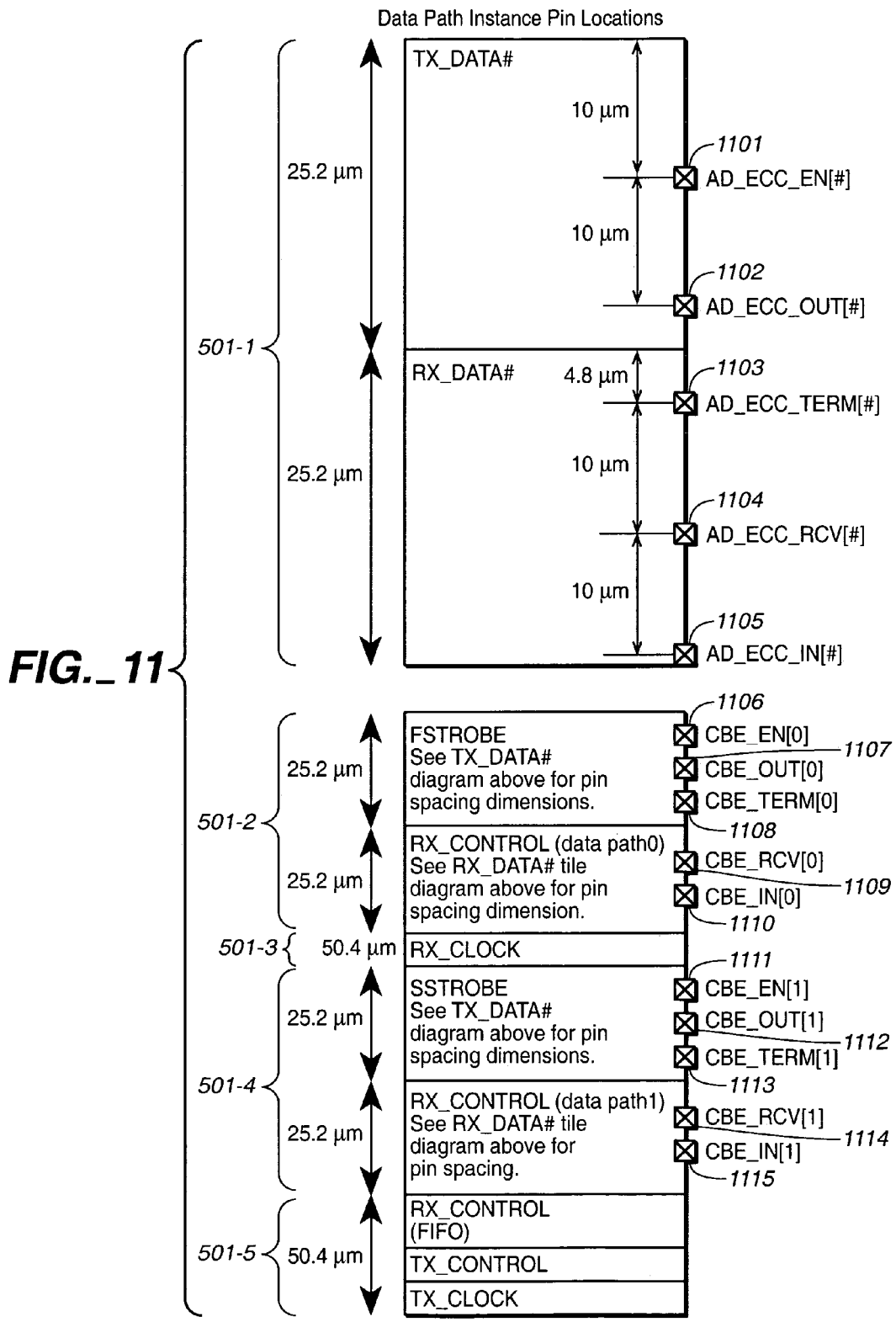
FIG._11

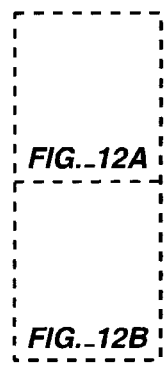
FIG._12
FIG._12A
Top Level Floor Plan
↙ 1200
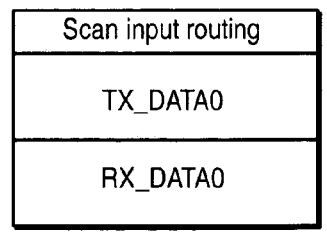
LSI_SCAN_IN[2:0]
Data path instance pins:
TxD_ECC_EN[#]
TxD_ECC_TERM[#]
TxD_ECC_RCV[#]
RxD_ECC_PCI[#]
TxD_ECC[#]
RxD_ECC_DDR[#]
RxD_ECC_SDR[#]
TxD_ECC[#]
RxD_ECC_DDR[#]
AD_ECC_EN[0]
AD_ECC_OUT[0]
AD_ECC_TERM[0]
AD_ECC_RCV[0]
AD_ECC_IN[0]

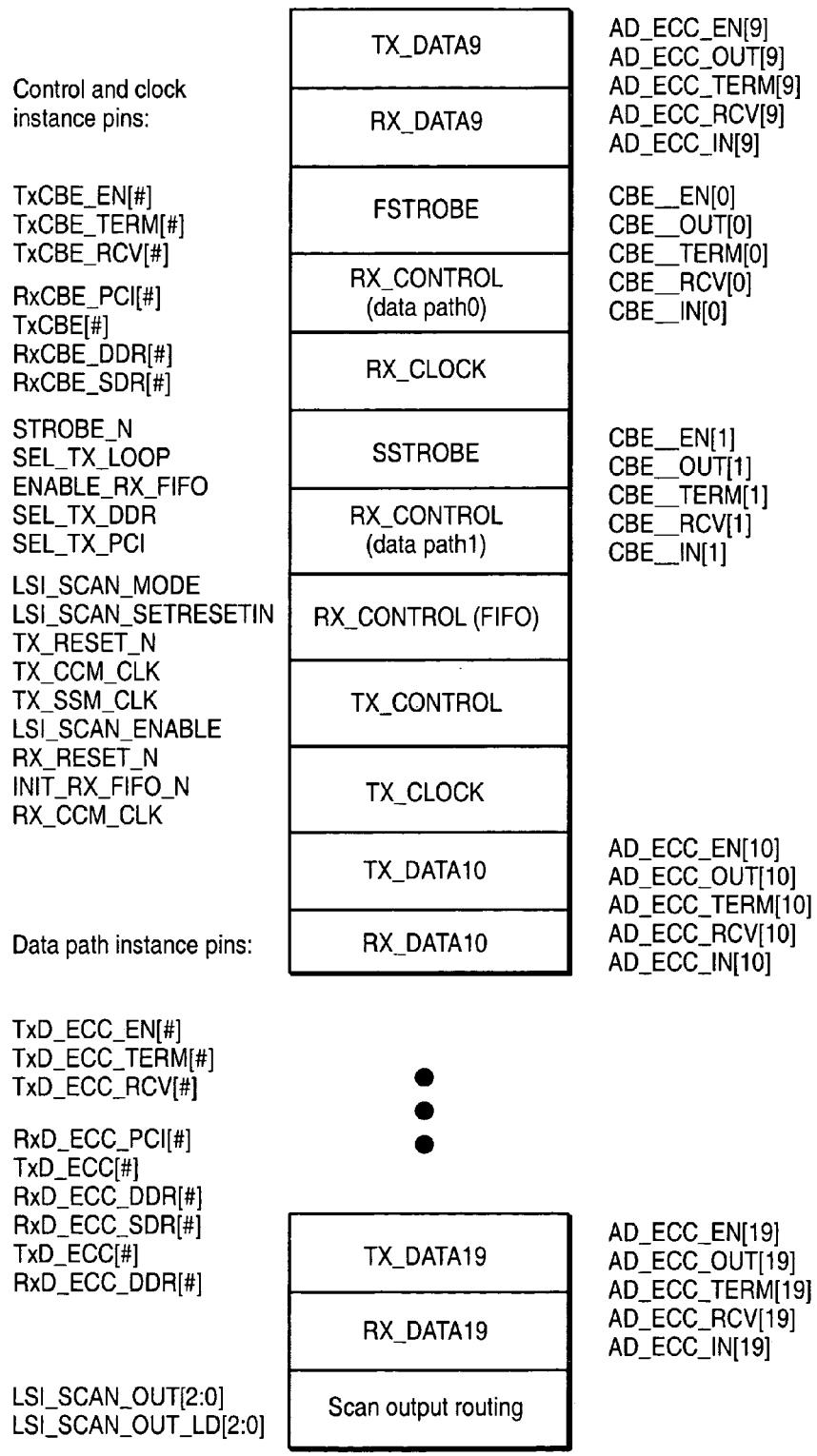
FIG._12B

MACRO CELL FOR INTEGRATED CIRCUIT PHYSICAL LAYER INTERFACE

FIELD OF THE INVENTION

The present invention relates to semiconductor integrated circuits and, more particularly, to hard macro cells that can be instantiated in an integrated circuit design for driving a physical layer interface.

BACKGROUND OF THE INVENTION

Physical layer (PHY) interface devices are used on integrated circuits for communicating with external devices, such as other integrated circuits, typically through a data bus or a set of signal wires. The physical layer device is typically configured to implement a desired communication protocol or specification that has been established for the particular interface. For example, the Peripheral Component Interconnect (PCI) bus specification is an industry standard specification for high-performance input-output (IO) interconnections for transferring data between a CPU and its peripherals. As versions of these standards change over time to achieve greater performance, the demands on the physical layer interface device become more stringent.

Currently, "PCI-X 2.0 bus" is the newest high-speed version of the conventional PCI bus specification, which supports signaling speeds up to 533 mega-transfers per second. For example, the specification can support signaling speeds of 66, 133, 266 and 533 mega-transfers per second.

The timing requirements for a PCI-X 2.0 PHY interface are challenging. The transmitter in the interface uses source-synchronous technology, which transmits the data with a corresponding clock strobe signal to the receiver for compensating for most of the signal propagation delays between the two devices. This interface enables synchronous data transfer between two devices at a single data rate (SDR) or a double data rate (DDR). For SDR transfers, the transmitter transfers data on each successive rising edge of the clock strobe signal. For DDR transfers, the transmitter transfers data on each successive rising and falling edge of the clock strobe signal. DDR transfers therefore transmit two data words per clock cycle.

With these higher transfer speeds, the skew between the data and the clock strobe signal becomes crucial. For example, in the PCI-X 2.0 266 MTS specification the maximum skew between the data and the clock strobe signals at the output pins of the transmitter is 900 picoseconds (ps), whereas the maximum skew at the receiver is 610 ps. In addition, the maximum output delay (transition time) of signals of the transmitter is 3.5 nanoseconds (ns). This output delay must be met at the outputs of the transmitter given the input delays to the transmitter, uncertainties on the input clock signals to the transmitter and propagation delay through the logical paths of the transmitter. Therefore, timing closure for such a physical layer interface can be difficult and time consuming.

In an effort to meet these timing requirements, integrated circuit designers have manually placed the logic components of the physical layer interface close to the IO buffers of the integrated circuit. The designers have also manually routed the IO signals such that they are on the same routing layers as one another and have the same lengths and routing patterns to ensure the signals have minimum skew.

After placement and routing, estimates of the chip-level parasitic capacitances are extracted, and the delay timing is calculated and validated. If the timing requirements are not met, the placement and routing will need to be modified. The validation process is iterated until the timing requirements are met. Therefore, heavy human intervention is used for the manual placement and routing that are involved to meet high performance interface timing requirements, such as those associated with the PCI-X 2.0 specification. This work is non-repetitive since it is unique to each integrated circuit design. This work is thus a time consuming process due to the manual and iterative steps involved.

Improved physical layer interface devices are therefore desired, which simplify the placement and routing of the interface such that timing closure for the interface can be met in an efficient manner.

SUMMARY OF THE INVENTION

One embodiment of the present invention is directed to a macro cell for an integrated circuit design having an input-output (IO) region with a plurality of IO buffer cells physically dispersed with other cells in IO slots along an interface portion of the IO region. The macro cell includes a plurality of macro cell IO signal slots that are physically dispersed so as to substantially align with the IO buffer cells in the interface portion. The macro cell also includes an interface definition having a plurality of source-synchronous interface IO signal nets including a multiple-bit data bus and a first clock strobe net. Signals on the data bus have a desired phase alignment with respect to signals on the first clock strobe net. The nets are routed to corresponding ones of the plurality of macro cell signal slots. The macro cell is adapted to be instantiated as a unit in the integrated circuit design.

Another embodiment of the present invention is directed to a macro cell for instantiation in an integrated circuit design. The macro cell includes a physical layer interface definition and a plurality of macro cell IO slots. The physical layer interface definition includes a multiple-bit data bus and a first clock strobe net. Signals on the data bus have a desired phase alignment with respect to signals on the clock strobe net. The macro cell IO slots are electrically coupled to respective bits in the multiple-bit data bus and the first clock strobe net and are physically dispersed from one another in a spacing pattern that is defined for at least one integrated circuit package type. The macro cell is adapted to be instantiated in the integrated circuit design as a unit.

Another embodiment of the present invention is directed to an integrated circuit layout definition, which includes an input-output (IO) region and a macro cell instantiated in the layout definition. The IO region includes an interface portion and a plurality of IO buffer cells physically dispersed with other cells in IO slots along the interface portion. The macro cell includes a plurality of macro cell IO signal slots that are physically dispersed so as to substantially align with corresponding ones of the IO buffer cells in the interface portion, and includes an interface definition having a plurality of source-synchronous interface IO signal nets, which are routed to corresponding ones of the plurality of macro cell signal slots and include a multiple-bit data bus and a clock strobe net. Signals on the data bus have a desired phase alignment with respect to signals on the clock strobe net.

BRIEF DESCRIPTION OF THE DRAWINGS

FIG. 1 is a block diagram illustrating the use of PHY macro cells within a PCI-X 2.0 data transfer interface, according to one embodiment of the present invention.

FIG. 2 is a block diagram, which schematically illustrates logical components of the PHY macro cells shown in FIG. 1.

FIG. 3 is a schematic diagram illustrating a portion of a transmit section of the PHY macro cell, according to one embodiment of the present invention.

FIG. 4 is a schematic diagram illustrating a portion of a receive section of the PHY macro cell, according to one embodiment of the present invention.

FIG. 5 is a diagram illustrating alignment of IO slots in the PHY macro cell with the IO slots in the IO region of the integrated circuit for an HP-EPBGA package.

FIGS. 6A and 6B together show an interface "pinout" within the IO region for the HP-EPBGA package having a 32-bit PCI-X 2.0 interface.

FIG. 7 is a diagram illustrating alignment of IO slots in the PHY macro cell with the IO slots in the IO region of the integrated circuit for an FPBGA-4L package.

FIGS. 8A and 8B together show an interface "pinout" within the IO region for the FPBGA-4L package having a 32-bit PCI-X 2.0 interface.

FIG. 9 is a diagram illustrating alignment of IO slots in the PHY macro cell with the IO slots in the IO region of the integrated circuit for an FPBGA-HP package.

FIGS. 10A and 10B together show an interface "pinout" within the IO region for the FPBGA-HP package having a 32-bit PCI-X 2.0 interface.

FIG. 11 is a diagram illustrating physical contact pin locations within the IO slots of the PHY macro cell, according to one embodiment of the present invention.

FIG. 12 is a diagram illustrating a top level floor plan for the placement and arrangement of the logical components that form the PHY macro cell, according to one embodiment of the present invention.

DETAILED DESCRIPTION OF ILLUSTRATIVE EMBODIMENTS

Semiconductor integrated circuits are traditionally designed and fabricated by first preparing a schematic diagram or hardware description language (HDL) specification of a logical circuit in which functional elements are interconnect to perform a logical function. For example, with standard cell technology, the schematic diagram or HDL specification is synthesized into standard cells of a specific cell library. Each cell corresponds to a logical function unit, which is implemented by one or more transistors that are optimized for the cell. The cells in the cell library are defined by cell definitions. Each cell library definition includes a cell layout definition and cell characteristics. The cell layout definition includes a predetermined layout pattern for the transistors in the cell, geometry data for the cell's transistors and cell routing data.

These cells can correspond to low-level functions, such as logical "AND", "OR", "NOR gates or higher-level functions such as a phase-locked loops, memories or central processing units (CPUs). The higher-level cells are referred to as "macro cells". A macro cell can include fully custom logic, one or more lower-level cells and/or one or more higher-level cells. A hard macro cell includes a predefined layout pattern of pre-placed logical components within the cell, geometry data for these pre-placed components and routing data for routing the interconnections between the components. A hard macro cell can be selected from a cell library or other database and instantiated as a single unit within the overall layout pattern of a semiconductor integrated circuit design.

In one embodiment of the present invention, a physical layer (PHY) interface device is implemented as a hard macro cell, wherein the internal timing paths are manually constructed and balanced to meet tight signal skew requirements. The PHY interface hard macro cell can be instantiated as a single unit one or more times near the IO buffers or IO region of the integrated circuit to form an PHY interface having any number of bits. This significantly simplifies the routing of signals to and from the IO buffers and eliminates any manual placement or routing within the macro cell by the integrated circuit designer at the time of instantiation.

As described in more detail below, the IO slots of the PHY interface macro cell are physically dispersed to match the IO buffer slot width and pitch of the integrated circuit on which the macro cell is instantiated. This allows substantially straight alignment of IO signals between the macro cell and the IO buffers, which enables simplified routing of the IO signals and their related control signals, between the macro cell and the IO buffers. The IO slot width and pitch can vary depending on technology with which the integrated circuit is fabricated and the type of package in which the integrated circuit is mounted. In one embodiment, the IO slots of the macro cell are physically dispersed to substantially match the slot widths and pad pitches of multiple integrated circuit packages.

FIG. 1 is a block diagram illustrating the use of PHY macro cells within a PCI-X 2.0 data transfer interface 10, according to one embodiment of the present invention. Interface 10 includes phase-locked-loop (PLL) 12, PCI-X 2.0 controller 14, and PCI-X 2.0 interface transceiver 16. Transceiver 16 includes physical layer (PHY) interface hard macro cells 18 and IO interface buffers 20. Interface buffers 20 drive a multiple-bit data bus 22, which is external to the integrated circuit on which interface 10 is fabricated. In one embodiment, data bus 22 is a 64-bit wide PCI-X 2.0 266 bus. However, interface 10 can be adapted to drive buses of any width and according to any specification or protocol in alternative embodiments of the present invention. IO interface buffers 20 are placed in predefined "IO slots" within an IO region of the integrated circuit on which interface 10 is fabricated. An IO slot is an area in the IO region that is dedicated to the placement of an IO buffer or another cell for supporting IO functions.

PLL 12 generates clock signals for controlling transmit and receive functions within transceiver 16. Controller 14 communicates with macro cells 18 over internal buses 24. Internal buses 24 carry transmit data "Tx DATA" and receive data "Rx DATA" to and from PHY macro cells 18. In one embodiment, each bus 24 has 32 transmit data bits and 32 receive data bits. However, any other number of bits can be used in alternative embodiments. In addition, controller 14 provides frame and control bits (not shown in FIG. 1) for bus 22.

PHY macro cells 18 buffer transmit and receive data, generate the appropriate clock strobe signals for transmit operations, and resynchronize received data to a local clock domain. Transmit and receive data is passed between PHY macro cells 18 and interface IO buffers 20 over data buses 30. In one embodiment, each data bus 30 includes a 16-bit transmit data bus, a 16-bit receive data bus and related control signals. Each transmit and receive data word is accompanied by one or more clock strobe signals 32.

In one embodiment, each PHY macro cell 18 is configured to support single data rate (SDR) and double data rate (DDR) transfer operations. To support SDR transfer operations, each PHY macro cell 18 includes a set of registers used to register-out the data signals. For DDR operations, two sets of registers are used to register the data signals, and a double-rated clock is used to multiplex the data signals to interface IO buffers 20. These internal timing paths can be manually constructed and balanced by the designer of the macro cell prior to instantiation within an integrated circuit design to meet tight signal skew requirements.

By implementing each PHY interface block as a macro cell, the integrated circuit designer can simply instantiate one or more of the macro cells in their design without needing to place and route the internal logic components. The slot width and pitch between the IO slots of IO buffers 20 are typically determined by the type of package in which the integrated circuit is mounted. The IO slots within each PHY macro cell 18 are physically dispersed to substantially match the IO slot width and pitch of interface IO buffers 20. This allows substantially straight alignment of the signals routed across buses 30 and 32. Once the PHY macro cells 18 have been instantiated, these signals can be quickly and easily routed to IO buffers 20 with minimal skew between the signals. In one embodiment, the IO slots of each PHY macro cell 18 are physically dispersed to match the pad pitch of a generic ASIC flip-chip package.

The PHY macro cell is not design-specific, but can be reused in other interface designs with the same semiconductor technology. It can also be repeatedly used to implement a wide bus. The PHY macro cell significantly reduces the manual work that is involved during basic implementation and improves design turn-around time. For example, PHY macro cells 18 can be used in a drag-and-drop fashion, and can be seen as "black boxes" in any ASIC design phase.

FIG. 2 is a block diagram, which schematically illustrates the major logical components of the interface circuit within each PHY macro cell 18. However, any interface circuit can be used in alternative embodiments of the present invention and the details of the interface circuit itself are unimportant. In this example, PHY macro cell 18 includes a transmit section 50 and a receive section 52. Transmit section 50 has a transmit data input 51, transmit data outputs 52 and 53 and clock strobe output 54. Receive section 52 includes receive data output 55, receive data input 56 and clock strobe signal input 57. Transmit data input 51 and receive data output 55 form internal bus 24 shown in FIG. 1. Transmit data outputs 52 and 53 and receive data input 56 form data bus 30 shown in FIG. 1. Similarly, clock strobe signal outputs 54 and clock strobe signal 57 form the clock strobe signals 32 shown in FIG. 1. Also, in this example each 16 bits of data are accompanied by four Error Correction Code (ECC) bits, which are not shown in FIG. 2.

Transmit section 50 includes backwardly-compatible PCI/PCI-X control block 60, PCI-X 2.0 transmit control block 61, clock distribution block 62, 8-bit data paths 63 and 64 and clock strobe path 65. Clock distribution block 62 receives a PLL clock from PLL circuit 12 (shown in FIG. 1) and control signals from controller 14 (also shown in FIG. 1). Transmit control blocks 60 and 61 receive transmitted data words on input 51 and direct the data words through data paths 63 and 64, while clock strobe path 65 generates the appropriate clock strobe signals on output 54.

Receive section 52 includes clock generation block 70, clock distribution block 71, common clock receive control block 72, data capture register block 73, data deserializer block 74 and data resynchronizing block 75. Clock generation block 70 generates receive clock signals based on the clock strobe signals received on input 57 for capturing received data in block 73. Data deserializer 74 de-multiplexes the received data, and resynchronizing circuit 75 resynchronizes the received data to an on-chip clock domain.

FIG. 3 is a schematic diagram illustrating a portion of transmit section 50 according to one embodiment of the present invention. Again, the particular implementation shown in FIG. 3 is provided as an example only for illustration purposes. Any other transmit circuit can be used in alternative embodiments of the present invention.

Transmit section 50 includes IO driver state control circuit section 90, multiplexing and DDR generation section 91, and strobe generation section 92. IO driver state control section 90 controls the states (enable and termination states) of the transmit and receive IO buffers on a bit-by-bit basis. Inputs 101 are used to enable IO buffers for the 16 transmit bits, 16 receive bits and the corresponding ECC bits in the IO buffer region of the integrated circuit (IO interface buffers 20 in FIG. 1). Inputs 102 control the enable and termination states of the IO buffers for the two clock strobe signals used by the transmit and receive sections.

Input 103 selects between a PCI and a PCI-X mode of operation. Inputs 104 and 105 receive the 32 bits of transmit data and the corresponding eight bits of ECC. Input 106 selects between the SDR and DDR transmit modes. Inputs 107 and 108 are used for resetting the interface. Inputs 109 and 110 are used to control the SDR and the DDR clock strobe generation section 92. Input 111 receives a "1×" frequency clock and input 112 receives a "2×" frequency clock, which has a frequency that is twice the frequency of the 1× frequency clock. Input 113 is used for controlling scan testing of transmit section 50.

Outputs 120 and 122 are coupled to the state control inputs of interface IO buffers 20 (shown in FIG. 1). The signal net names having the label "AD" refer to address and data. Outputs 122–124 are coupled to the data inputs of interface buffers 20. Outputs 122 include the 16 transmit data bits (address and data) and the corresponding four ECC bits, which are transmitted at either the single or double data rate. Output 123 includes a first clock strobe signal CBE_OUT[0] for single data rate transfers and output 124 includes a second clock strobe signal CBE_OUT[1] for double data rate transfers. Outputs 125–130 are internal signals to the PHY macro cell.

FIG. 4 is a schematic diagram illustrating a portion of receive section 52, according to one embodiment of the present invention. Again, any type or arrangement of a data receiver can be used in alternative embodiments of the present invention. Receiver section 52 includes an IO cell interface with inputs 140–142 and output 143, which are coupled to interface IO buffers 20 shown in FIG. 1. Input 140 includes the 16 bits of received data and the four bits of corresponding ECC data. Inputs 141 and 142 include the two clock strobe signals received with the receive data. Output 143 is used for a loop-back mode and provides the 16 received data bits, the four ECC bits and the two clock strobe signals to the interface IO buffers.

On the core side of receiver section 52, the receiver section includes a plurality of control inputs 144–151, which are coupled to controller 14, shown in FIG. 1. Input 144 controls the loop back mode of the interface. Input 145 enables a receive data FIFO. Inputs 146 and 151 receive "1×" and "2×" clock signals for the receive circuit. Input 147 controls a scan mode for testing receiver section 152. Input 148 initializes the receive FIFO, and inputs 149 and 150 are used for resetting elements of the receiver. Input 152 feeds the received data, ECC and clock strobe bits back to output 143 for the loop back mode.

Receiver section 52 further includes outputs 160–166, which are provided to controller 14 shown in FIG. 1. Input 160 is used in the PCI mode to pass a received data word straight through to the controller. Output 161 is used in the PCI-X 1.0 mode for single data rate transfers. Outputs 162 and 166 are used in PCI-X 2.0 mode for double data rate transfers. Outputs 163, 164 and 165 are used for passing the received clock strobe signals to the controller in the various operating modes.

As mentioned above, the IO slots of the PHY macro cell are physically dispersed to match the IO slot pitch of the IO region of the integrated circuit. The IO slot pitch is often determined by the type of package in which the integrated circuit will be mounted. Also, the type of data bus to which the interface will be connected may have timing, power and other requirements that can effect the spacing and arrangement of the data and clock strobe bits within the IO region. In one embodiment of the present invention, these factors are taken into consideration when arranging the layout of the IO slots in the PHY macro cell such that instantiation of the PHY macro cell will result in substantial alignment of the data and clock strobe bits.

A. Package Types

In one embodiment of the present invention, the IO slots of the PHY macro cell are physically dispersed to match the IO pad pitch of three different types of integrated circuit packages, which are commercially available from LSI Logic Corporation of Milpitas, Calif. These packages include:

1. High Performance Enhanced Plastic Ball Grid Array (HP-EPBGA) Package;
2. Four Layer Flip Chip Plastic Ball Grid Array (FPBGA-4L); and
3. Six Layer High Performance Flip Chip Plastic Ball Grid Array (FPBGA-HP).

However, the PHY macro cell can be arranged to match the pad pitch of any other integrated circuit package type. The HP-EPBGA has an IO slot width (pad pitch) of 50.02 um, the FPBGA-4L has an IO slot width of 56.7 um, and the FPBGA-HP has an IO slot width of 50.4 um. In one embodiment, the PHY macro cell is optimized for an IO slot width of 50.4 um, which aligns with the FPBGA-HP package. Although with this spacing, the IO slots of the PHY macro cell will not align exactly with the 50.02 um slot width of the HP-EPBGA package or the 56.7 um slot width of the FPBGA-4L flip chip package. However, the pin outs are sufficiently aligned so as to allow for minimal routing complexity between the PHY macro cell and the IO buffers of the package.

Examples of the slots alignments for each of these package types are shown in more detail below with reference to FIGS. 5–10.

B. Performance Criteria

For each of these package types, the IO region of the integrated circuit is arranged to satisfy certain performance criteria for the desired bus, such as the bus described in the PCI-X 2.0 specification, for example. The sections below discuss some of these performance criteria for the different package types and illustrate how these criteria affect the spacing of data bus bits in the IO region.

C. Decoupling Capacitance

Every IO bit should have an adequate decoupling capacitance from the various power supply buses to ground. In one example, the integrated circuit has three power supply buses within the IO region, which can be named VDDIO1533PCIX2, VDDIO33PCIX2, and VREF15. The VDDIO1533PCIX2 power supply bus can be biased at either 1.5 volts or 3.3 volts, for example. The VDDIO33PCIX2 power supply bus is biased at 3.3 volts, for example. The VREF15 power supply bus is biased at a 1.5 volt reference voltage, for example.

In order to provide sufficient power supply decoupling capacitances, decoupling capacitance (DCAP) cells are placed in selected IO slots within the IO region (IO interface buffers 20 in FIG. 1) of the integrated circuit. In one embodiment, each DCAP cell provides effectively 115 pF of decoupling capacitance and includes an ESD protection resistance of 2 Ohms between the corresponding power rail and the DCAP circuitry. The effective resistance of the DCAP cells is reduced based on the number of DCAP cells that are coupled to the power supply rail.

The same DCAP cell is used for filling IO slots in each of the package types. In one embodiment, the width of the DCAP cell is the same as a PCI-X 2.0 IO slot width of 50.02 um. The number of DCAP cells varies depending on the package used.

The following summarizes the ratio of DCAP cells to IO bits in the data section only with respect to the PHY macro cell for the three package types:

1. HP-EPBGA: a ratio of 4 DCAP cells to 5 IOs is maintained.
2. FPBGA-4L: a ratio of 4 DCAP cells to 7 IOs is maintained. To make use of the empty 6.68 um of space between IOs (56.7 um–50.02 um), a custom DCAP filler cell can be utilized to fill the unused space and achieve more decoupling capacitance.
3. FPBGA-HP: a ratio of about 4 DCAP cells to 5 IOs is maintained.

In addition, any unused IO slots in the IO region can be filed with DCAP cells. Again, these values are provided as examples only.

D. Power Cuts

A power cut is a conductive segment coupled to or forming part of a power supply rail. In one embodiment of the present invention a power cut is routed between the control section and the data section of the IO interface buffers for a 32-bit and a 64-bit PCI-X 2.0 interface. However, a power cut is not routed between adjacent PHY macro cells for a 64-bit interface.

E. Electro Static Discharge Protection

For the HP-EPBGA and the FPBGA-4L IO interface buffers, a single custom ESD protection cell (labeled "DVDD" in FIGS. 5–10) provides ESD protection for all three power supply rails. These ESD DVDD cells are placed within selected IO slots of the interface IO buffers, similar to the DCAP cells.

In one embodiment, the placement requirements for the ESD DVDD cells are summarized as follows:

1. A spacing of less than or equal to $[16*W_{\textit{eff}}]$ is desired between two neighboring DVDD cells, wherein $W_{\textit{eff}}$ is the slot width of the IO buffers for the particular package.
2. The spacing between each IO pad (data or clock strobe signal) and the next adjacent DVDD cell should be less than or equal to $[8*W_{\textit{eff}}]$.
3. The spacing between each VSS2 Power Pad and the nearest DVDD cell should be less than of equal to 330 um.
4. The spacing between neighboring VDDIO33PCIX2 Power Pads should be less than or equal to $[16*W_{\textit{eff}}]$.

To provide adequate ESD protection and sufficient ESD margin, a $W_{\textit{eff}}$ of 50.02 um will be assumed for the placement requirements defined above. However, the placement requirement defined in (4) shown above will assume $W_{\textit{eff}}$ is 61.58 um. The following table summarizes the placement preferences in terms of [$W_{\it eff}$].

TABLE 1

| Requirement | Spacing Rqmt $W_{\it eff}$ = 50.02 um) | Maximum # of IO Slots for Spacing Requirement | | |
|---|---|---|---|---|
| | | HP-EPBGA (Slot Width = 50.02 um) | 4 Layer FC 9 mil (Slot Width = 56.7 um | HP 6Layer FC 8 mil (Slot Width = 50.4 um) |
| #1 | 800.32 um | 15 | 13 | 14 |
| #2 | 400.16 um | 7 | 6 | 7 |
| #3 | 330 um | 6 | 5 | 6 |
| #4 | 958.28 um | 18 | 16 | 18 |
| $W_{\it eff}$ = 61.58 um | | | | |

F. Example of Power Requirements

The following section summarizes examples of power requirements for the DATA and CONTROL sections of the PCI-X 2.0 Interface IO buffers. The term "Power Pins" assumes that power is supplied by the respective Power Supply Rail that is routed along the buffers in the IO region, while "Power Cell" refers to an IO slot that receives power routed through signal connections.

F.1 Data Section Power
1. A power plane is desired for the VDDIO1533PCIX2 supply, which can supply either 1.5V or 3.3V. An SSO ratio of 4:1:1 or better should be maintained within the data section, i.e., (4 or less signals for every VDDIO1533PCIX2 and VSSIOPCIX2 power pin).
2. The VDDIO33PCIX2 supply is powered on-chip through signal pins via a PCIX2VDDIO33 Power Cell. An 8:1:1 should be maintained within the data section, i.e., (8 signals for every PCIX2VDDIO33 Power Cell and VSSIOPCIX2 power pin).
3. The VREF15 supply is powered on-chip through a DDRVREFPCIX2LS1533 Cell. Every Hard Macro includes a VREF15 supply pin for MODE2 operations. The VREF33 supply for MODE1 operations is generated within the IO region, therefore no pins required in the interface.

F.2 Control Section
(with Package Plane)
1. A power plane is recommended for the VDDIO1533PCIX2 supply, which supplies only 3.3V. An SSO ration 4:1:1 or better should be maintained within the PCI-X 2.0 Interface, i.e., (4 or less signals for every VDDIO1533PCIX2 and VSSIOPCIX2 power pin).
 The VDDIO33PCIX2 supply is powered on-chip through signal pins. The VDDIO33PCIX2 and VDDIO1533PCIX2 power rings are shorted together within a special PCIX2VDDIO1533 Power Cell designed for the Control Section.
(with no Package Plane)
2. The VDDIO1533 supply is powered on-chip through signal pins via the PCIX2VDDIO33PCIX2 Power Cell, which shorts together the VDDIO1533PCIX2 and VDDIO22PCIX2 rings within the Power Cell. An SSO ratio of 4:1:1 or better should be maintained within the control section, i.e., (4 or less signals for every PCIX2VDDIO1533 power cell and VSSIOPCIX2 power pin).

F.2 BZ (High Impedance) Control Section
(with Package Plane)
1. PCIX2VDDIO15 and PCIX2VSSIO Power Cells are not needed since the BZ Controller is supplied power through the VDDIO1533PCIX2 and VSSIOPCIX2 power pins.
2. A PCIX2VDDIO33 Power Cell is not needed since the VDDIO33PCIX2 supply is powered by the BZVDD pad of the BZ Controller which is set to 3.3V.
(with no Package Plane
1. PCIX2VDDIO15 and PCIX2VSSIO Power Cells are desired to provide the BZ Controller with the VDDIO1533PCIX2 and VSSIOPCIX2 power supplies.
2. A PCIX2VDDIO33 Power Cell is not required since the VDDIO33PCIX2 supply is powered by the BZVDD pad of the BZ Controller which is set to 3.3V.

G. IO Slot Layout for the HP-EPBGA Package

For the HP-EPBGA package, the IO region of the integrated circuit has an IO slot width of 50.02 um in one embodiment of the present invention. Decoupling capacitor cells are placed within the IO buffer ring to provide the most efficient decoupling of the IO signals. Each DCAP cell utilizes a 50.02 um slot width within the buffer ring and provides effectively 115 pF of decoupling capacitance per cell. For the PCI-X 2.0 interface used in this example, the 3-pad row implementation of the HP-EPBGA package is used.

Tables 2 and 3 summarize an example of the number of slots used and the total IO slot width for the following cases: a single PHY macro cell (16-bit interface), a pair of PHY macro cells (32-bit interface)and four PHY macro cells (a 64-bit interface).

TABLE 2

| | Number of IO Slots (Width = 50.02 um) | | |
|---|---|---|---|
| HP-EPBGA (3PAD ROW) | Hard Macro 16 Bits | 32 Bit Bus | 64 Bit Bus |
| Signals (includes data, ECC, mode select, address and STROBE) | 22 | 44 | 88 |
| A/D DECAPS | 18 | 40 | 80 |
| ESD | 3 | 12 | 20 |
| A/D 3.3 V Bias | 2 | 6 | 12 |
| A/D VREF15 | 1 | 2 | 4 |
| Control/Frame | x | 13 | 13 |
| Control/Frame 3.3 V Bias | x | 6 | 6 |
| C/F DECAPS | x | 9 | 9 |
| B/Z Reference | x | 7 | 7 |
| Total [um] | 46 | 139 | 239 |

TABLE 3

| | Total PCI-X 2.0 Interface Width (um) | | |
|---|---|---|---|
| HP-EPBGA (3 Pad Row) | Hard Macro | 32 Bit Bus | 64 Bit Bus |
| Signals (includes data ECC, mode select, address and STROBE) | 1100.44 | 2200.88 | 4401.76 |
| A/D DECAPS | 900.36 | 2000.80 | 4001.60 |
| ESD | 150.06 | 600.24 | 1000.40 |
| A/D & Control/Frame 3.3 V Bias | 100.04 | 300.12 | 600.24 |

TABLE 3-continued

|  | Total PCI-X 2.0 Interface Width (um) | | |
| --- | --- | --- | --- |
| HP-EPBGA (3 Pad Row) | Hard Macro | 32 Bit Bus | 64 Bit Bus |
| A/D VERF15 | 50.02 | 100.04 | 200.08 |
| Control/Frame | 0.00 | 650.26 | 650.26 |
| Control/Frame 3.3 V Bias | 0.00 | 300.12 | 300.12 |
| C/F DECAPS | 0.00 | 450.18 | 450.18 |
| BZ Reference | 0.00 | 350.14 | 350.14 |
| Total [um] | 2300.92 | 6952.78 | 11954.78 |

FIG. 5 is a diagram illustrating alignment of the IO slots in macro cell 18 with the IO slots in an IO region 500 of the integrated circuit for an HP-EPBGA package. The interface IO buffers 20 shown in FIG. 1 are placed in selected slots in IO region 500.

PHY macro cell has a plurality of IO slots 501 arranged in a column. Similarly, IO region 500 has a plurality of IO slots 502, which are also arranged in a column and are dedicated for PHY macro cell 18. PHY macro cell 18 is placed near IO slots 502 such that slots 501 substantially align with IO slots 502.

The width of each IO slot 501 in PHY macro cell 18 is 50.4 um, as shown by arrow 504, according to one embodiment of the present invention. Unused IO slots are cross-hatched, and used IO slots are labeled generically as "BIT #0" to "BIT #21". The IO slots labeled BIT #0 to BIT #9 are used for locating contact pins for the least significant eight bits of data and two corresponding bits of ECC that are transmitted to or received from corresponding slots 502 in IO region 500. Each IO slot defines the contact pin locations for all signals associated with one bit of data. For example, the IO slot labeled BIT #0 defines the contact pin locations for the least significant transmit data bit (122 in FIG. 3), the corresponding enable and termination bits (120 in FIG. 3), the least significant receive data bit (140 in FIG. 4) and the least significant loop back bit (144 in FIG. 4). The contact pin locations are described in more detail below with reference to FIG. 11.

Similarly, the IO slots labeled BIT #12 to BIT #21 are used for locating contact pins for the most significant eight bits of data and two corresponding bits of ECC that are transmitted to or received from corresponding slots 502 in IO region 500. The label "AD[x8]" refers to 8 bits of address and data, and the labels "Cat1_Sig[1]", "Cat1_Sig[2]", "Cat1_Sig[3]", and "Cat1_Sig[4]" refer to ECC bits.

The IO slots labeled BIT #12 to BIT #21 are used for locating contact pins for the two clock strobe signals and their corresponding enable signals. The labels "C/BE[A]#" and "C/BE[A]#" refer to the two clock strobe signals and their enables (such as clock strobe output 123, the corresponding enable and termination control bits 121 and the received clock strobe input 141 (shown in FIGS. 3 and 4).

Since IO region 500 is designed for an HP-EPBGA package, each IO slot 502 has a slot width of 50.02 um, for example, as shown by arrow 520. A variety of different types of cells are placed in IO slots 502. These types are identified in legend 521.

A first set the IO slots 502 are used for placing IO buffer cells 522 for buffering transmit and/or receive signals transferred over the interface bus 22 (shown in FIG. 1). Each buffer cell 522 has inputs and/or outputs electrically connected to the corresponding contact pins in a corresponding one of the macro cell IO slots 501, as shown by arrows 540.

Another set of the IO slots 502 is used for placing power supply decoupling capacitance cells 524. The decoupling capacitor cells 524 are coupled between corresponding power supply rails on the integrated circuit and the ground rail for reducing fluctuations in the power supply voltages caused by device switching in the interface buffer region. The decoupling capacitance cells are physically dispersed among the IO buffer cells 522 at a spacing that is selected for the particular technology in which the integrated circuit is fabricated and the package on which the integrated circuit is mounted, as discussed above.

Another set of IO slots 502 is used for placing electrostatic discharge (ESD) protection cells 526 (labeled DVDD). The ESD cells 526 are also physically dispersed among the IO buffer cells 522 according to the spacing discussed above, for example.

Another set of IO slots 502 is used for placing power cells 528. In one example, power cells 528 are used for receiving a 3.3 volt IO power supply voltage and driving corresponding power supply rails on the integrated circuit. However, any other voltage level can be used. A further set of IO slots 502 is used for placing a reference voltage input cell 530 (labeled VREF15) for receiving an input reference voltage of 1.5 volts, for example.

As discussed above, the decoupling capacitance cells 524, ESD protection cells 526, power cells 528 and voltage reference cells 530 are dispersed among the IO buffer cells 522. This causes the IO buffer cells 522 to be physically dispersed along the interface portion of the IO region 500. In other words, not all of the IO buffer cells 522 for a given data bus are located adjacent to one another within IO region 500.

The corresponding IO slots in macro cell 18 are physically dispersed within macro cell 18 to align substantially with the IO buffer cells 522 in IO region 500. This significantly simplifies the routing of signals (shown by arrow 540) on the integrated circuit between macro cell 18 and the IO buffers 522. Macro cell 18 can therefore be placed near IO region 500 and instantiated repeatedly to create a bus of any suitable width without causing difficulties in routing or unsatisfactory skew between signals in the interface. Skew between the data signals and clock strobe signals can be more tightly controlled. This significantly reduces the manual work that is involved during integrated circuit design and implementation and improves design turn-around-time.

FIGS. 6A and 6B together show the interface "pinout" within IO region 500 for an HP-EPBGA package having a 32-bit PCI-X 2.0 interface. FIGS. 6A and 6B are arranged such that the bottom of FIG. 6A is aligned with the top of FIG. 6B. The numerical spacing shown in FIGS. 6A and 6B are provided as examples only.

For a 32-bit PCI-X 2.0 interface, two PHY macro cells 18 are used, which are labeled HARDMACRO#0 and HARDMACRO#1. PHY macro cells 18 are separated by power supply rails 600. In addition, a set of interface control signals, high impedance reference cells and ESD cells 602 and 604 are placed between the PHY macro cells 18.

H. IO Slot Alignment for the FPBGA-4L Package

For the FPBGA-4L package, the IO region of the integrated circuit has an IO slot width of 56.7 um.

Again, decoupling capacitor cells are placed within the IO region to provide decoupling of the IO signals from fluctuations in the power supply rails. Each decoupling capacitance cell consumes a slot width 50.02 um and provides effectively 115 pF of decoupling capacitance per cell.

Tables 4 and 5 summarize the number of slots and total width for the cases of a single PHY macro cell (16-bit PCI-X 2.0 interface), twp PHY macro cells (a 32-bit PCI-X 2.0 interface), and four PHY macro cells (a 64-bit PCI-X 2.0 interface).

TABLE 4

| 4-Layer Flip Chip (9 mil) | Number of I/O Slots (Width = 56.7 um) | | |
|---|---|---|---|
| | Hard Macro | 32 Bit Bus | 64 Bit Bus |
| Signals (includes data, ECC, mode select, address and STROBE | 22 | 44 | 88 |
| A/D DECAPS | 13 | 32 | 64 |
| ESD | 3 | 12 | 20 |
| A/D 3.3 V Bias | 2 | 6 | 12 |
| A/D VREF15 | 1 | 2 | 4 |
| Control/Frame | x | 13 | 13 |
| Control/Frame 3.3 V Bias | x | 6 | 6 |
| C/F DECAPS | x | 9 | 9 |
| BZ Reference | x | 7 | 7 |
| Total [um] | 41 | 131 | 223 |

TABLE 5

| 4-Layer Flip Chip (9 mil) | Total PCI-X 2.0 Interface Width (um) | | |
|---|---|---|---|
| | Hard Macro | 32 Bit Bus | 64 Bit Bus |
| Signals (includes data, ECC, mode select, address and STROBE) | 1247.40 | 2494.80 | 4989.60 |
| A/D DECAPS | 737.10 | 1814.40 | 3628.80 |
| ESD | 170.10 | 680.40 | 1134.00 |
| A/D & Control/Frame 3.3 V Bias | 113.40 | 340.20 | 680.40 |
| A/D VREF15 | 56.70 | 113.40 | 226.80 |
| Control/Frame | 0.00 | 737.10 | 737.10 |
| Control/Frame 3.3 V Bias | 0.00 | 340.20 | 340.20 |
| C/F DECAPS | 0.00 | 510.30 | 510.30 |
| BZ Reference | 0.00 | 396.90 | 396.90 |
| Total [um] | 2324.70 | 7427.70 | 12644.10 |

Again, the above values and signals are provided as examples only.

FIG. 7 is a diagram illustrating the alignment of the IO slots 501 within PHY macro cell 18 and corresponding IO slots 502 in IO region 500 for the 9 mil, 4-layer flip chip package FPBGA-4L. The same references numerals are used in FIG. 7 as were used in FIG. 5 for the same or similar elements.

In this example, IO slots 502 have a width 700 of 56.7 um. Although slot width 700 is greater than that of the slot width 504 in PHY macro cell 18, the 22 bits of signal slots in PHY macro cell 18 substantially align with the corresponding IO buffer cells in IO slots 522, as shown by arrows 706. Again, the IO buffer cells 522 are physically dispersed in region 500 to satisfy a particular set of design rules. The corresponding signal slots in macro cell 18 are also physically dispersed to substantially align with the physical disbursement in IO region 500.

Since the IO buffer cells 522 for the PCI-X 2.0 interface consume only 50.02 um, as shown by arrow 702, the remaining area 704 can be used for decoupling capacitances. Additional decoupling capacitance cells can be placed in these areas.

FIGS. 8A and 8B are similar to FIGS. 6A and 6B and show an example of the layout of IO slots within IO region 500 for an FPBGA-4L package having a 32-bit PCI-X 2.0 interface. The same reference numerals are used in FIGS. 8A and 8B as were used in FIGS. 6A and 6B for the same or similar elements. Again, two PHY macro cells 18 are used and are separated by power supply rails 600. However, the numerical spacing shown in FIGS. 8A and 8B are changed to reflect the larger slot width.

I. IO Slot Alignment for the FPBGA-HP

The slot width in the IO region for the 8 mil, 6-layer high performance flip chip package is 50.4 um. Again, decoupling capacitor cells are placed in selected IO slots to provide capacitive decoupling of the IO signals. Each decoupling capacitor cell has a width of 50.02 um and provides effectively 115 pF of decoupling capacitance. The following tables summarize the number of slots and the total width for the cases of a single PHY macro cell (16-bit PCI-X 2.0 interface), twp PHY macro cells (a 32-bit PCI-X 2.0 interface), and four PHY macro cells (a 64-bit PCI-X 2.0 interface).

TABLE 6

| 6 Layer HP Flip-Chip (8 mil) | Number of I/O Slots (Width = 50.4 um) | | |
|---|---|---|---|
| | Hard Macro | 32 Bit Bus | 64 Bit Bus |
| Signals (includes data, ECC, mode select, address and STROBE) | 22 | 44 | 88 |
| A/D DECAPS | 17 | 40 | 80 |
| ESD | 3 | 12 | 20 |
| A/D 3.3 V Bias | 2 | 6 | 12 |
| A/D VREF15 | 1 | 2 | 4 |
| Control/Frame | x | 13 | 13 |
| Control/Frame 3.3 V Bias | x | 6 | 6 |
| C/F DECAPS | x | 9 | 9 |
| BZ Reference | x | 7 | 7 |
| Total [um] | 45 | 139 | 239 |

TABLE 7

| 6 Layer HP Flip-Chip (8 mil) | Total PCIX2.0 Interface Width (um) | | |
|---|---|---|---|
| | Hard Macro | 32 Bit Bus | 64 Bit Bus |
| Signals (includes data, ECC, mode select, address and STROBE) | 1108.80 | 2217.60 | 4435.20 |
| A/D DECAPS | 856.80 | 2016.00 | 4032.00 |
| ESD | 151.20 | 604.80 | 1008.00 |
| A/D & Control/Frame 3.3 V Bias | 100.80 | 302.40 | 604.80 |
| A/D VREF15 | 50.40 | 100.80 | 201.60 |
| Control/Frame | 0.00 | 655.20 | 655.20 |
| Control/Frame 3.3 V Bias | 0.00 | 302.40 | 302.40 |
| C/F DECAPS | 0.00 | 453.60 | 453.60 |
| BZ Reference | 0.00 | 352.80 | 352.80 |
| Total [um] | 2268.00 | 7005.60 | 12045.60 |

FIG. 9 is a diagram similar to FIGS. 5 and 7, but illustrates the alignment of IO slots 501 in PHY macro cell 18 with corresponding IO slots 502 in IO region 500 for an IO slot width of 50.4 um. In this example, the physical spacing of IO slots 501 in PHY macro cell 18 corresponds exactly with the physical spacing with IO slots 502 in IO region 500.

As shown by arrows 900 and 902, the decoupling capacitor cells and the IO buffers cells use only 50.02 um of the 50.4 um slot width.

FIGS. 10A and 10B are similar to FIGS. 6A and 6B and FIGS. 8A and 8B, but show the physical spacing for a 32-bit PCI-X 2.0 interface pinout for a slot width of 50.4 um. The same reference numerals are used in 10A and 10B as were used in the previous figures for the same or similar elements.

J. PHY Macro Cell IO Slot Contact Layout

FIG. 11 is a diagram illustrating the physical contact pin locations within the IO slots 501 of PHY macro cell 18 according to one embodiment of the present invention. FIG. 11 illustrates five IO signal slots 501, which are labeled 501-1 to 501-5.

Slot 501-1 illustrates the layout of each "data" slot (address, data and ECC). Slot 501-1 can correspond to one of the slots labeled BITS #0–#9 and BITS #12–#21 in FIG. 5. Each of these slots includes a transmit data section "TX_DATA#" and a receive data section "RX DATA#", wherein the "#" can refer to any one of the bit numbers in the multiple-bit data bus. The transmit data section has a width of 25.2 um and has a transmit enable pin 1101 and a corresponding transmit data output pin 1102. The receive data section has a width of 25.2 um and includes a termination control pin 1103, a receive data loop back pin 1104 and a receive data input pin 1105.

In one embodiment, each instance of the transmit data section and the receive data section in PHY macro cell 18 has identical placement and routing, excluding scan chains. Pins 1101–1105 in slot 501-1 are electrically coupled to the corresponding IO signal nets shown in FIGS. 3 and 4. For example, pin 1101 is routed to a corresponding enable bit in enable output 120 shown in FIG. 3. These signal routes and the placement of the pin location in each slot 501-1 are predefined within the macro cell.

IO slot 501-2 corresponds to the first clock strobe signal (labeled BIT #10 in FIG. 5). Slot 501-2 includes a first strobe transmit section "FSTROBE" and a first strobe receive section "RX_CONTROL", each having a width of 25.2 um for a total width of 50.4 um. The first strobe transmit section includes a clock strobe enable pin 1106, a clock strobe output pin 1107 and a clock strobe termination control pin 1108. The clock strobe receive section includes a received clock strobe loop back output 1104 and a clock strobe input pin 1110. Pins 1106–1110 are electrically coupled to corresponding signal nets in FIGS. 3 and 4.

Similarly, IO slot 501-4 corresponds to the second clock strobe signal and includes a clock strobe transmit section "SSTROBE" and a clock strobe receive section "RX_CONTROL" having pins 1111–1115. In one embodiment, IO slots 501-2 and 501-4 have identical placement and routing to one another, excluding any scan chains. Also, the placement and routing can match the placement and routing in the data I/O slots, such as slot 501-1.

FIG. 12 is a diagram illustrating a top level floor plan 1200 for the placement and arrangement of the logical components that form PHY macro cell 18. This layout pattern corresponds to the layout pattern of the IO slots shown in FIG. 5, for example. Other floor plans can also be used in alternative embodiments. The corresponding input and output signal nets that are coupled to each section of the floor plan are shown to the left and right sides of the floor plan. The signal nets listed on the left-hand side of the floor plan are routed to corresponding logic within the core of the integrated circuit, such as PLL 12 and controller 14 shown in FIG. 1. The signal nets listed on the right-hand side of the floor plan are routed to corresponding IO slots 502 in IO region 500 (IO buffers 20 in FIG. 1) of the integrated circuit.

Although the present invention has been described with reference to preferred embodiments, workers skilled in the art will recognize that changes may be made in form and detail without departing from the spirit and scope of the invention. For example, the present invention can be used with any interface or bus, and is not limited to PCI-type buses. The specific slot widths and IO signals are also provided as examples only. The terms "input-output" or "IO" can refer to bi-directional input-output signals or pins, unidirectional input signals or pins, or unidirectional output signals or pins, for example.

What is claimed is:

1. A macro cell for an integrated circuit design having an input-output (IO) region with a plurality of IO buffer cells physically dispersed with other cells in IO slots along an interface portion of the IO region, the macro cell comprising:

a plurality of macro cell IO signal slots that are physically dispersed so as to substantially align with the IO buffer cells in the interface portion; and an interface definition comprising a plurality of source-synchronous interface IO signal nets including a multiple-bit data bus, each bit comprising a transmit bit, a receive bit and an enable bit, and first and second clock strobe nets, wherein signals on the data bus have a desired phase alignment with respect to signals on the first and second clock strobe nets, wherein the IO signal nets are routed to corresponding ones of the plurality of macro cell IO signal slots, which define the physical pin locations for the respective transmit bit, receive bit and enable bit, and wherein the macro cell is adapted to be instantiated as a unit in the integrated circuit design.

2. The macro cell of claim 1 wherein the macro cell IO signal slots are dispersed among other, unused IO slots within the macro cell.

3. The macro cell of claim 1 wherein the interface definition defines circuitry adapted to transfer data over the data bus at a first data rate with every other transition on at least one of the first and second clock strobe nets and at a second, faster data rate with each transition on at least one of the first and second clock strobe nets.

4. The macro cell of claim 1 wherein the interface definition defines a transceiver configured to implement a PCI-X 2.0 physical layer interface specification.

5. The macro cell of claim 1 wherein the plurality of IO buffer cells is physically dispersed with other cells selected from the group comprising decoupling capacitor cells, electrostatic discharge protection cells and power supply cells.

6. A macro cell for instantiation in an integrated circuit design, the macro cell comprising:

a physical layer interface definition comprising a multiple-bit data bus, each bit comprising a transmit bit, a receive bit and an enable bit, and a first clock strobe net, wherein signals on the data bus have a desired phase alignment with respect to signals on the clock strobe net; and a plurality of macro cell input-output (IO) slots, which are electrically coupled to respective bits in the multiple-bit data bus and the first clock strobe net and are physically dispersed from one another in a spacing pattern that is defined for at least one integrated circuit package type, wherein the respective macro cell IO slot for each of bit of the data bus defines physical pin locations for the transmit bit, receive bit and enable bit, and wherein the macro cell is adapted to be instantiated in the integrated circuit design as a unit.

7. The macro cell of claim 6 wherein:
the spacing pattern is defined for a plurality of different integrated circuit package types.

8. The macro cell of claim 6 wherein:
the integrated circuit design has an IO region with a plurality of IO buffer cells physically dispersed with other cells in IO slots along an interface portion of the IO region according to the package type; and
the plurality of macro cell IO signal slots are physically dispersed so as to substantially align with corresponding ones of the IO buffer cells along the interface portion.

9. The macro cell of claim 8 wherein the plurality of IO buffer cells is physically dispersed with other cells selected from the group comprising decoupling capacitor cells, electrostatic discharge protection cells and power supply cells.

10. The macro cell of claim 6 wherein the macro cell IO signal slots are dispersed among other, unused IO slots within the macro cell.

11. The macro cell of claim 6 wherein:
the physical layer interface definition further comprises a second clock strobe net electrically coupled to a corresponding one of the macro cell IO slots, wherein signals on the data bus have a desired phase alignment with respect to signals on the second clock strobe net.

12. The macro cell of claim 6 wherein the physical layer interface definition defines circuitry adapted to transfer data over the data bus at a first data rate with every other transition on the first clock strobe net and at a second, faster data rate with each transition on the first clock strobe net.

13. The macro cell of claim 6 wherein the physical interface definition defines a transceiver configured to implement a PCI-X 2.0 physical layer interface specification.

14. An integrated circuit layout definition comprising:
an input-output (IO) region comprising an interface portion and a plurality of IO buffer cells physically dispersed with other cells in IO slots along the interface portion; and
a macro cell instantiated in the layout definition and comprising:
a plurality of macro cell IO signal slots that are physically dispersed so as to substantially align with corresponding ones of the IO buffer cells in the interface portion and
an interface definition comprising a plurality of source-synchronous interface IO signal nets, which are routed to corresponding ones of the plurality of macro cell signal slots and include a multiple-bit data bus, each bit comprising a transmit bit, a receive bit and an enable bit, and a clock strobe net, wherein the corresponding macro cell IO signal slot for each of bit of the data bus defines physical pin locations for the transmit bit, receive bit and enable bit, and wherein signals on the data bus have a desired phase alignment with respect to signals on the clock strobe net.

15. The integrated circuit of claim 14 wherein the plurality of IO buffer cells is physically dispersed with other cells selected from the group comprising decoupling capacitor cells, electrostatic discharge protection cells and power supply cells.

* * * * *